(12) United States Patent
Aoyama

(10) Patent No.: US 10,079,991 B2
(45) Date of Patent: Sep. 18, 2018

(54) IMAGING APPARATUS AND IMAGING METHOD

(71) Applicant: HONDA MOTOR CO., LTD., Tokyo (JP)

(72) Inventor: Chiaki Aoyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/465,993

(22) Filed: Mar. 22, 2017

(65) Prior Publication Data

US 2017/0280082 A1    Sep. 28, 2017

(30) Foreign Application Priority Data

Mar. 25, 2016   (JP) ................... 2016-062188

(51) Int. Cl.

| H04N 5/217 | (2011.01) |
|---|---|
| H04N 5/378 | (2011.01) |
| H04N 5/235 | (2006.01) |
| G01S 17/00 | (2006.01) |
| H04N 5/359 | (2011.01) |
| H04N 5/369 | (2011.01) |
| H04N 5/3745 | (2011.01) |

(52) U.S. Cl.
CPC ............ *H04N 5/378* (2013.01); *G01S 17/00* (2013.01); *H04N 5/2351* (2013.01); *H04N 5/3598* (2013.01); *H04N 5/3696* (2013.01); *H04N 5/37452* (2013.01)

(58) Field of Classification Search
CPC .................................................. H04N 5/3598
USPC .......................................................... 348/241
See application file for complete search history.

(56) References Cited

U.S. PATENT DOCUMENTS

| 6,803,958 | B1 * | 10/2004 | Wang | H04N 5/243 348/308 |
|---|---|---|---|---|
| 6,963,367 | B1 * | 11/2005 | Hashimoto | H04N 5/3598 250/208.1 |
| 7,167,200 | B1 * | 1/2007 | Phan | H04N 5/3598 348/296 |
| 2004/0036783 | A1 * | 2/2004 | Barna | H04N 5/3598 348/300 |
| 2006/0262211 | A1 * | 11/2006 | Kido | H04N 5/23245 348/308 |

FOREIGN PATENT DOCUMENTS

JP            3517614         1/2004

* cited by examiner

*Primary Examiner* — Anthony J Daniels
(74) *Attorney, Agent, or Firm* — Rankin, Hill & Clark LLP

(57) ABSTRACT

An imaging apparatus includes: a light reception unit that receives a light emission signal from a transmission apparatus via a pixel; a detection unit that detects whether or not an output based on the light emission signal received by the light reception unit is a first threshold value or more; and a correction unit that corrects a luminance of the pixel when the output based on the light emission signal is the first threshold value or more based on a result detected by the detection unit.

4 Claims, 16 Drawing Sheets

IMAGING APPARATUS AND IMAGING METHOD

CROSS-REFERENCE TO RELATED APPLICATION

Priority is claimed on Japanese Patent Application No. 2016-062188, filed on Mar. 25, 2016, the contents of which are incorporated herein by reference.

BACKGROUND

Field of the Invention

The present invention relates to an imaging apparatus and an imaging method.

Background

Apparatuses are known in which light emitted from a light emission part is received by using a photodetector such as a photodiode to thereby recognize the shape and the like of the light emitted from the light emission part. In such an apparatus, when usual light is received, an output voltage from the photodetector is an appropriate one. On the other hand, in a case where strong light represented by sunlight and the like is received, even when reading out a reset level, due to the leakage of charged electric charges, the level of a signal output which is generated from the output signal of the photodetector obtained by calculating the difference from the reset level is decreased, and therefore, a blackening phenomenon in which a black part in an image arises may occur.

In order to prevent the effect of the blackening phenomenon, it has been proposed that, after a plurality of active pixel sensors are reset, when a reset voltage output to an electric signal converted by the photodetector is in a voltage range that is lower than a voltage in a non-signal duration, the reset voltage is replaced by (fixed to) a predetermined voltage value (for example, refer to Japanese Patent No. 3517614).

Here, an example of the blackening phenomenon is described.

FIG. 16 is a view showing an example in which light having a predetermined luminance or more is incident on a photodetector according to the related art. In FIG. 16, an image g901 shows an example in which light is incident on the photodetector that includes 6×6 pixels. Figure g910 shows a case in which light having an appropriate level is incident on the photodetector that includes the 6×6 pixels. Figure g920 shows a case in which light having a saturation level is incident on the photodetector that includes the 6×6 pixels, and weak saturation arises. Figure g930 shows a case in which light having a saturation level is incident on the photodetector that includes the 6×6 pixels, and strong saturation arises.

Graphs g911, g921, and g931 are graphs showing an example of a luminance output with respect to a cross-sectional direction in a cross-section in the A-B direction of the image g901. In the graphs g911, g921, and g931, the horizontal axis represents a position in the cross-sectional direction in the cross-section in the A-B direction of the image g901, and the vertical axis represents the level of the luminance output.

Graphs g912, g922, and g932 are graphs showing an example of a signal output with respect to the cross-sectional direction in the cross-section in the A-B direction of the image g901. In the graphs g912, g922, and g932, the horizontal axis represents a position in the cross-sectional direction in the cross-section in the A-B direction of the image g901, and the vertical axis represents the level of the signal output.

When the luminance of the light incident on the photodetector is appropriate, as shown in the graph g911, the luminance at the third position in the A to B direction is the highest. When the incidence level on the photodetector is appropriate, as shown in the graph g912, the signal output level of the photodetector also represents a result corresponding to the luminance output, and the signal output level at the third position in the A to B direction is the highest.

When the luminance of the light incident on the photodetector is strong to a degree in which weak saturation arises with respect to the output, as shown in the graph g921, the luminance at the second to fourth positions in the A to B direction is saturated. As the luminance output is saturated, as shown in the graph g922, the signal output level of the photodetector at the third position in the A to B direction at which the signal output is the largest in the case of the incident light having an appropriate luminance is substantially zero, that is, a black level, and the signal output level of the photodetector at the adjacent second and fourth positions is also a value different from a real signal output.

When the luminance of the light incident on the photodetector is stronger than that of the graph g921 and is strong to a degree in which strong saturation arises with respect to the output, as shown in the graph g931, the luminance at the first and fifth positions in the A to B direction is saturated. In this case, the luminance of the incident light is too high, and therefore, the level of the luminance output at the second to fourth positions is not appropriate. As the luminance output is saturated, as shown in the graph g932, the signal output level of the photodetector at the first to fifth positions in the A to B direction is substantially zero, that is, a black level.

SUMMARY

However, according to the technique disclosed in Japanese Patent No. 3517614, as shown in Figure g930 of FIG. 16, when a further bright place at which strong saturation arises is pinpointed, even if the saturated output level is replaced by a predetermined value, for example, all levels of the signal output at the first to fifth positions in the A to B direction become the same value. In this way, according to the technique disclosed in Japanese Patent No. 3517614, the levels of the signal output of pixel regions in which saturation arises become the same, and therefore, there may be a case in which an edge (shape) which is a luminance boundary and a peak cannot be acquired.

An object of an aspect of the present invention is to provide an imaging apparatus and an imaging method capable of appropriately acquiring an edge (shape) which is a luminance boundary and a peak even when a further bright place is imaged while preventing a blackening phenomenon.

(1) An imaging apparatus according to an aspect of the present invention includes: a light reception unit that receives a light emission signal from a transmission apparatus via a pixel; a detection unit that detects whether or not an output based on the light emission signal received by the light reception unit is a first threshold value or more; and a correction unit that corrects a luminance of the pixel when the output based on the light emission signal is the first threshold value or more based on a result detected by the detection unit.

(2) In the above imaging apparatus, the detection unit may detect whether or not the output based on the light emission signal is the first threshold value or more based on an output value after an electric charge accumulation of the pixel is reset and an output value when an electric charge accumulation of the pixel is read out after the light reception unit is exposed.

(3) In the above imaging apparatus, the correction unit may correct, when the output based on the light emission signal is the first threshold value or more, the luminance of the pixel by adding a value obtained by multiplying a difference between an average value or a standard value of the output value after the electric charge accumulation of the pixel is reset and the output value after the electric charge accumulation of the pixel is reset by a predetermined gain to a difference between the output value when the electric charge accumulation of the pixel is read out after the light reception unit is exposed and the output value after the electric charge accumulation of the pixel is reset.

(4) The above imaging apparatus may include: a clustering unit that performs classification into clusters by using at least one of an amplitude of a signal output by the correction unit and a luminance based on a signal output by the light reception unit, wherein the light reception unit may include a plurality of the pixels, and the clustering unit may calculate, for each cluster, at least one of a coordinate of a pixel which is a maximum value of the amplitude of the signal and a coordinate of a pixel which is a maximum value of the luminance based on the signal output by the light reception unit.

(5) In the above imaging apparatus, the clustering unit may determine the calculated coordinate of the pixel which is a maximum value of the amplitude of the signal or the calculated coordinate of the pixel which is a maximum value of the luminance based on the signal output by the light reception unit as a center of a region of interest of which the light emission signal should be taken in next.

(6) An imaging method according to another aspect of the present invention includes: (a) by way of a light reception unit, receiving a light emission signal from a transmission apparatus via a pixel; (b) by way of a detection unit, detecting whether or not an output based on the light emission signal received in (a) is a first threshold value or more; and (c) by way of a correction unit, correcting a luminance of the pixel when the output based on the light emission signal is the first threshold value or more based on a result detected in (b).

According to the configuration (1) or (6) described above, the output is corrected in accordance with the progress state of the saturation of the output, and therefore, even when a further bright place is imaged, it is possible to appropriately capture an edge (shape) of the part while being capable of preventing a blackening phenomenon.

According to the configuration (2) described above, it is possible to correct the output when the output of the pixel of the light reception unit is saturated, and therefore, even when a further bright place is imaged, it is possible to appropriately capture an edge (shape) of the part while being capable of preventing a blackening phenomenon.

According to the configuration (3) described above, a gain that should be added is determined in consideration of an output reduction amount due to a leakage arising from the saturation state, and therefore, even when a still further bright place is imaged, it is possible to appropriately capture the edge.

According to the configuration (4) described above, the clustering is performed based on the amplitude or the luminance after correction with respect to the plurality of pixels included in the light reception unit, and thereby, it is possible to detect the size of the region of the light emission signal. Further, according to the configuration (4) described above, the position of the maximum value of the amplitude in the cluster or the position of the maximum value of the luminance after correction is detected, and thereby, it is possible to detect a center position of the light emission signal.

According to the configuration (5) described above, the center position of the light emission signal is set to the center of the space of interest, and thereby, it is possible to appropriately set the center of the light emission signal when the light emission signal is received next time.

DESCRIPTION OF THE EMBODIMENTS

Hereinafter, an embodiment of the present invention is described with reference to the drawings.

Figure 1:
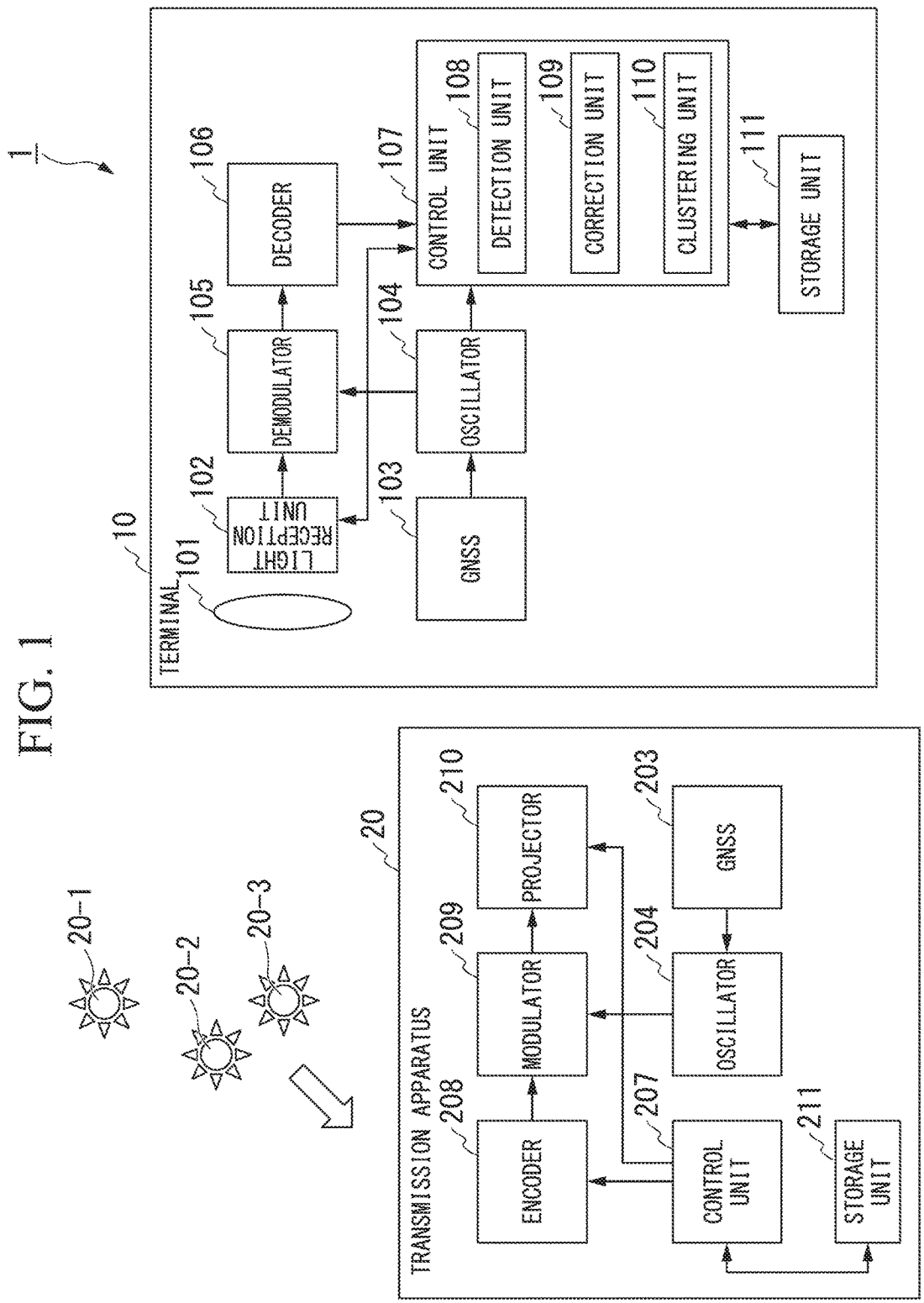
FIG. 1 is a system configuration view representing a configuration of a communication system according to an embodiment.

FIG. 1 is a system configuration view representing a configuration of a communication system 1 according to the present embodiment. As shown in FIG. 1, the communication system 1 includes a terminal 10 (imaging apparatus) and transmission apparatuses 20-1, 20-2, 20-3 . . . . The following embodiment is described using an example in which the terminal 10 is provided on a vehicle. In the following description, when one of the transmission apparatuses 20-1, 20-2, 20-3 . . . is not specified, the transmission apparatuses 20-1, 20-2, 20-3 . . . are simply referred to as a transmission apparatus 20.

As shown in FIG. 1, the terminal 10 includes a lens 101, a light reception unit 102, a GNSS 103, an oscillator 104, a demodulator 105, a decoder 106, a control unit 107, and a storage unit 111.

Each of the lens 101 and the light reception unit 102 of the terminal 10 is provided at the front and at the rear with respect to the travel direction of the vehicle. The control unit 107 includes a detection unit 108, a correction unit 109, and a clustering unit 110.

The transmission apparatus 20 includes a GNSS 203, an oscillator 204, a control unit 207, an encoder 208, a modulator 209, a projector 210, and a storage unit 211.

The transmission apparatus 20 is attached, for example, to a traffic light, a guardrail, an overpass, a pedestrian walkway, and another vehicle. The transmission apparatuses 20 encode a signal including an identifier (ID) by which the terminal is identified, a time code, a synchronization class, and information and transmit the encoded transmission signal to each other at a predetermined time. The synchronization class is information indicating a frequency accuracy of the oscillator 104 of the terminal 10 or the oscillator 204 of the transmission apparatus 20. In the present embodiment, for example, a frequency accuracy of a level synchronized with the GNSS 103 or the GNSS 203 is zero, a frequency accuracy of $10^{-10}$ or less is one, a frequency accuracy of more than $10^{-10}$ and $10^{-9}$ or less is two, and a frequency accuracy of $10^{-6}$ or more is three.

The terminal 10 receives a transmission signal transmitted by the transmission apparatus 20 according to an optical communication. The terminal 10 extracts information from the received transmission signal. The terminal 10 calculates a distance between the transmission apparatus 20 and the vehicle on which the terminal 10 is provided based on the received transmission signal.

First, the transmission apparatus 20 is described.

The GNSS (Global Navigation Satellite System(s)) 203 is a positioning system using a satellite (not shown). The GNSS 203 extracts a reference signal from a signal received from the satellite and outputs the extracted reference signal to the oscillator 204.

The oscillator 204 corrects the generated synchronization signal corresponding to the reference signal input from the GNSS 203 and outputs the corrected synchronization signal to the modulator 209. Alternatively, the oscillator 204 generates the synchronization signal by using the reference signal output by the GNSS 203 and outputs the generated synchronization signal to the modulator 209. The oscillator 204 may receive the synchronization signal from another transmission apparatus 20 instead of the GNSS 203 according to a wired or wireless method and may oscillate.

The storage unit 211 stores the ID of the transmission apparatus 20, information used for modulation or encoding, and the like.

The control unit 207 generates transmission information (including the ID) by using the information stored by the storage unit 211 and outputs the generated transmission information to the encoder 208. The control unit 207 controls the projector 210 to emit the transmission signal.

The encoder 208 encodes the transmission information output by the control unit 207 to generate a bit sequence.

The encoder 208 outputs the generated bit sequence to the modulator 209.

The modulator 209 modulates the bit sequence output by the encoder 208 by using the synchronization signal output by the oscillator 204, for example, in accordance with the DBPSK method to generate a carrier wave. The modulator 209 outputs the generated carrier wave to the projector 210. The modulation method performed by the modulator 209 is, for example, a method such as the 2π/3-DBPSK (Differential Binary Phase Shift Keying). The modulation method performed by the modulator 209 is not limited to the 2π/3-DBPSK modulation method.

The projector 210 performs phase modulation based on the carrier wave generated by the modulator 209 and transmits the phase modulation light which is a transmission signal applied with the phase modulation to the terminal 10 corresponding to the control of the control unit 207. The projector 210 includes an LED (Light-Emitting Diode) or a laser diode capable of transmitting, for example, a visible light pulse having, for example, a high rate (repetition frequency). The projector 210 may include an LED or a laser diode transmitting an infrared light pulse having a high rate.

Next, the terminal 10 is described.

The lens 101 causes a light beam including phase modulation light which is a transmission signal emitted by the transmission apparatus 20 and environment light to pass through the lens 101, and the lens 101 forms an image of the light beam that has passed through the lens 101 on the light reception unit 102. The terminal 10 may include an optical filter between the lens 101 and the light reception unit 102.

The light reception unit 102 has a structure in which a plurality of pixels are two-dimensionally arranged. The light reception unit 102 generates an electric charge corresponding to the received light depending on the pixel and accumulates the electric charge at a predetermined timing in response to the control of the control unit 107. The light reception unit 102 outputs a signal based on the accumulated electric charge to the control unit 107. The light reception unit 102 outputs a signal based on information output by the control unit 107 as a reception signal to the demodulator 105. The information output by the control unit 107 includes information indicating the luminance after correction for each pixel and a result of performing clustering for each predetermined region.

The GNSS 103 extracts a reference signal from a signal received from the satellite and outputs the extracted reference signal to the oscillator 104.

The oscillator 104 corrects the generated synchronization signal corresponding to the reference signal input from the GNSS 103 and outputs the corrected synchronization signal to the demodulator 105. Alternatively, the oscillator 104 generates the synchronization signal by using the reference signal output by the GNSS 103 and outputs the generated synchronization signal to the demodulator 105.

The demodulator 105 performs demodulation with respect to the reception signal output by the light reception unit 102 corresponding to the modulation method used by the modulator 209 of the transmission apparatus 20 and outputs the demodulated reception signal to the decoder 106. The control of the pixel may be performed by the demodulator 105.

The decoder 106 decodes the reception signal demodulated by the demodulator 105 corresponding to the encoding used by the encoder 208 of the transmission apparatus 20 and outputs the decoded reception signal to the control unit 107.

The control unit 107 controls the pixel included in the light reception unit 102. The control unit 107 acquires the signal output by the light reception unit 102 and obtains the amplitude, the phase, and the luminance of the acquired signal. When the luminance is a threshold value or more, the control unit 107 corrects the luminance and outputs the corrected luminance in association with information indicating the pixel to the light reception unit 102. The control unit 107 performs clustering based on the obtained amplitude, performs clustering based on the corrected luminance, and outputs the result of performing clustering to the light reception unit 102. The control unit 107 receives the transmission information from the transmission apparatus 20 that is output by the decoder 106 and extracts an ID, information, and phase information of the carrier wave from the received transmission information.

The control unit 107 converts position information of the light reception unit which is a two-dimensional surface into angular information and then converts the position information into three-dimensional position information by using distance information also to obtain three-dimensional relative position information between vehicles.

The detection unit 108 acquires the signal output by the light reception unit 102. The detection unit 108 determines, for each pixel, whether or not a voltage value or a current value of the acquired signal is equal to or more than a threshold value (first threshold value) for determining saturation that is stored in the storage unit 111. The detection unit 108 outputs the determination result to the correction unit 109 for each pixel.

The correction unit 109 corrects, for each pixel, the luminance by using a correction formula stored in the storage unit 111 when the voltage value or the current value is equal to more than the threshold value based on the determination result output by the detection unit 108. The correction unit 109 outputs the correction result to the clustering unit 110 for each pixel.

The clustering unit 110 acquires the correction result output by the correction unit 109 and obtains the amplitude, the phase, and the luminance for each pixel. The clustering unit 110 extracts a region including the predetermined number of pixels, performs clustering based on the amplitude, and further performs clustering based on the luminance for each extracted region. The region is, for example, 6×6 pixels of the pixels of the light reception unit 102. The clustering unit 110 outputs the result of performing clustering to the light reception unit 102 and the control unit 107. When the cluster is included in a plurality of regions as a result of clustering, the clustering unit 110 integrates clusters into one cluster according to a known method.

The storage unit 111 stores the ID of the terminal 10, information required for demodulation and decoding, a threshold value for determining saturation, a correction formula, the threshold value of the amplitude and the threshold value of the luminance used for clustering, received information, and the like.

[Configuration of Light Reception Unit 102]

Next, a configuration of the light reception unit 102 of the terminal 10 is described.

Figure 2:
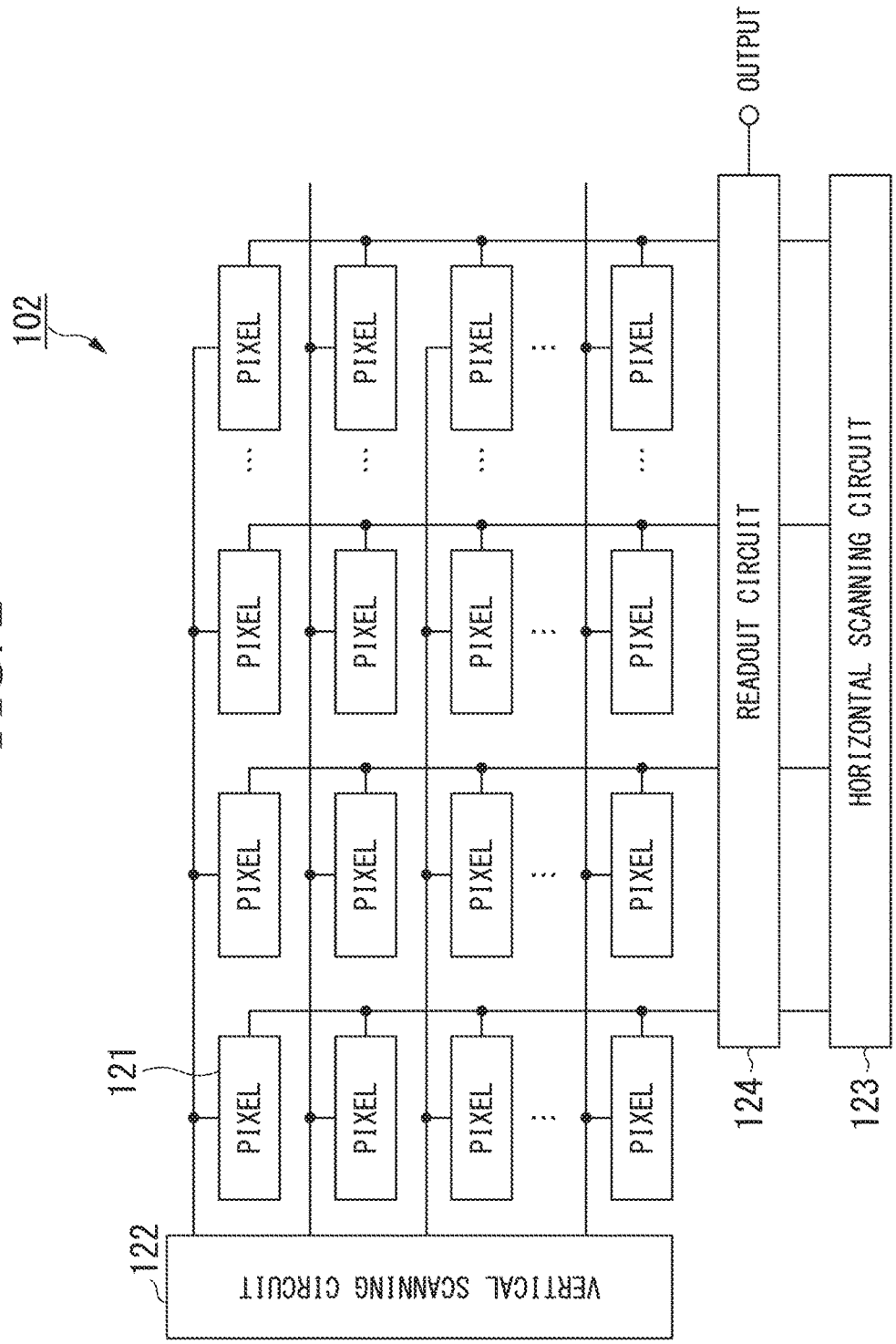
FIG. 2 is a schematic view representing a schematic configuration of a light reception unit according to the embodiment.

FIG. 2 is a schematic view representing a schematic configuration of the light reception unit 102 according to the present embodiment.

The light reception unit 102 includes a plurality of pixels 121, a vertical scanning circuit 122, a horizontal scanning circuit 123, and a readout circuit 124. The pixels 121 are arranged in a two-dimensional matrix form and receive light passing through the lens 101 (FIG. 1) to generate and accumulate an electric charge. The readout circuit 124 reads out a voltage level corresponding to the electric charges accumulated by each pixel 121 in response to the control by the vertical scanning circuit 122 and the horizontal scanning circuit 123. The voltage level which is read out is output to the demodulator 105 (FIG. 1) from the readout circuit 124.

In the present embodiment, when receiving a signal, the readout of the signal is performed in response to the control of the control unit 107 after performing an exposure.

[Configuration of Pixel 121]

Next, a configuration of the pixel 121 is described.

Figure 3:
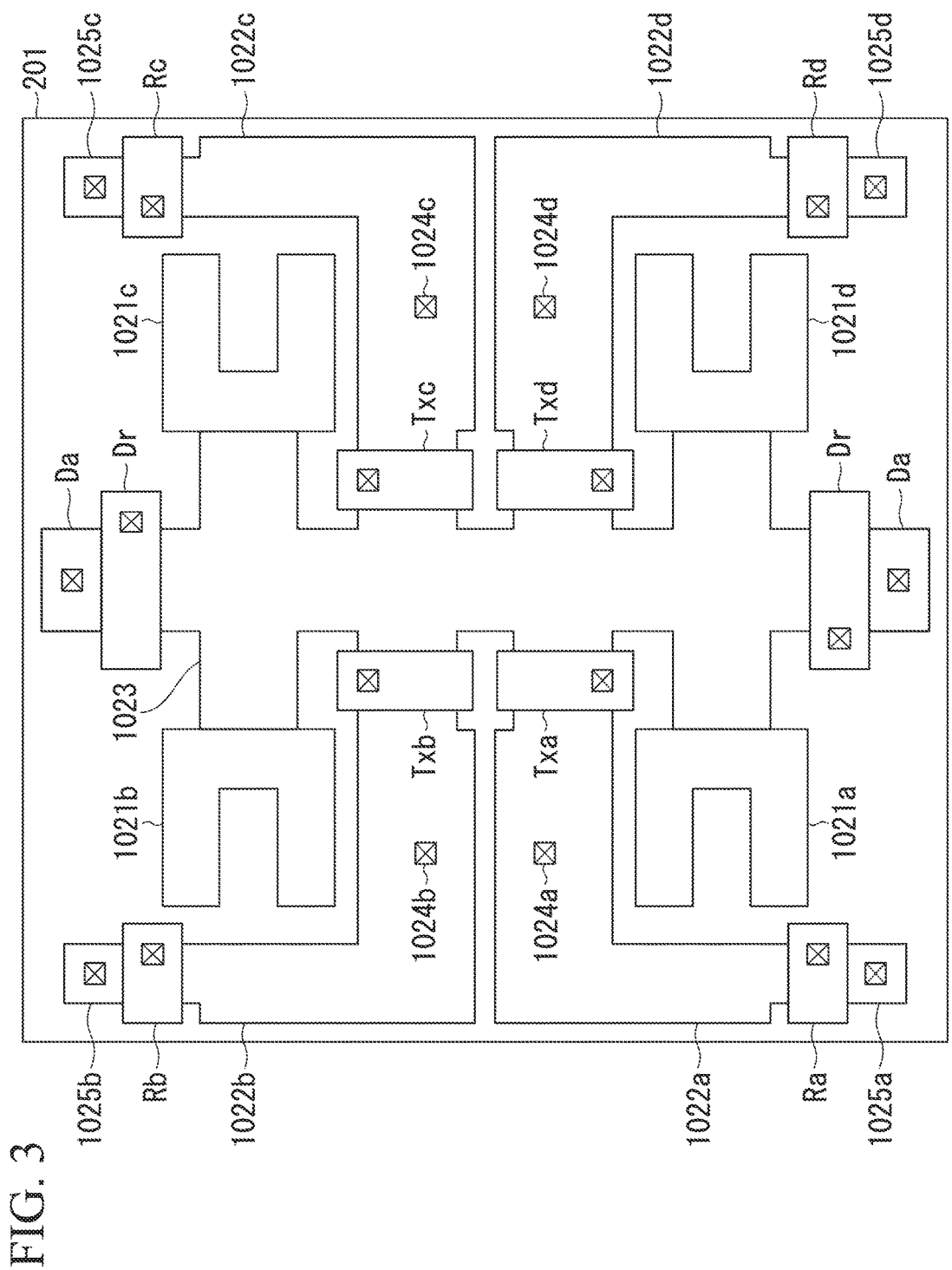
FIG. 3 is a configuration view representing a configuration of a pixel used for the light reception unit according to the embodiment.

FIG. 3 is a configuration view representing a configuration of the pixel 121 used for the light reception unit 102 according to the present embodiment.

A plurality of pixels 121 are arranged in the light reception unit 102 as shown in FIG. 3. The number of pixels is, for example, 1024 (transverse direction, x direction)×768 (longitudinal direction, y direction). Each pixel 121 includes four micro conversion units 1021*a* to 1021*d* (photoelectric conversion unit). Each of the micro conversion units 1021*a* to 1021*d* is formed by using a photoelectric conversion element. The pixel 121 includes four electric charge accumulation regions 1022*a* to 1022*d* (electric charge accumulation unit) and sort gates Txa to Txd (sort gate units) each corresponding to each of the electric charge accumulation regions 1022*a* to 1022*d*. The four micro conversion units 1021*a* to 1021*d* are connected to the electric charge accumulation regions 1022*a* to 1022*d* via an electric charge transfer region 1023 and the sort gates Txa to Txd.

Each of the micro conversion units 1021*a* to 1021*d* (photoelectric conversion unit) generates electric charges corresponding to the exposure amount.

One of the electric charge accumulation regions 1022*a* to 1022*d* (electric charge accumulation unit) accumulates the electric charges generated by each of the micro conversion units 1021*a* to 1021*d*.

The sort gate Txa is provided between the micro conversion unit 1021*a* (photoelectric conversion unit) and the electric charge accumulation region 1022*a* (electric charge accumulation unit) and controls entering of the electric charge from the micro conversion unit 1021*a* to the electric charge accumulation region 1022*a* according to opening and closing of the gate. Similarly, the sort gate Txf (f is any one of b, c, and d) is provided between the micro conversion unit 1021*f* (photoelectric conversion unit) and the electric charge accumulation region 1022*f* (electric charge accumulation unit) and controls entering of the electric charge from the micro conversion unit 1021*f* to the electric charge accumulation region 1022*f* according to opening and closing of the gate. In the present embodiment, a first electric charge accumulation unit is, for example, the electric charge accumulation region 1022*d*, and second to fourth electric charge accumulation units are electric charge accumulation regions 1022*a* to 1022*c*. A first sort gate unit is the sort gate Txa, and second to fourth sort gate units are the sort gates Txa to Txc.

The electric charge generated by photoelectric conversion in the micro conversion units 1021*a* to 1021*d* moves to the electric charge transfer region 1023 having a lower potential. When one of the sort gates Txa to Txd is opened, the electric charge moves from the electric charge transfer region 1023 to one of the electric charge accumulation regions 1022*a* to 1022*d* that corresponds to the opened one of the sort gates Txa to Txd. Then, the electric charge which has moved to each of the electric charge accumulation regions 1022*a* to 1022*d* is accumulated by each of the electric charge accumulation regions 1022*a* to 1022*d* until a predetermined timing. Then, the accumulated electric charge is read out at the predetermined timing from readout electrodes 1024*a* to 1024*d* via the readout circuit 124 (FIG. 2) to the demodulator 105 (FIG. 1).

The pixel 121 includes reset gates Ra to Rd and reset electrodes 1025a to 1025d each being adjacent to each of the electric charge accumulation regions 1022a to 1022d. When one of the reset gates Ra to Rd is opened, each of the electric charge accumulation regions 1022a to 1022d is charged by a voltage V applied to each of the reset electrodes 1025a to 1025d to be a reset state. The reset process is simultaneously performed to the electric charge accumulation regions 1022a to 1022d of all pixels 121 (FIG. 2) of the light reception unit 102 (FIG. 1).

The pixel 121 (FIG. 2) includes a drain gate Dr and a drain electrode Da.

When the drain gate Dr is opened, an excess electric charge of the charges accumulated in the electric charge transfer region 1023 moves to the drain electrode (drain terminal) Da. The excess electric charge is an accumulated electric charge, for example, when light having a higher intensity than a predetermined intensity is incident on the pixel 121. In this way, when light is incident at a higher intensity than the predetermined intensity, the drain gate Dr and the drain electrode Da are used in order to prevent the accumulated electric charge from overflowing to adjacent pixels.

[Equivalent Circuit of Pixel 121]

Next, an equivalent circuit of the pixel 121 is described.

Figure 4:
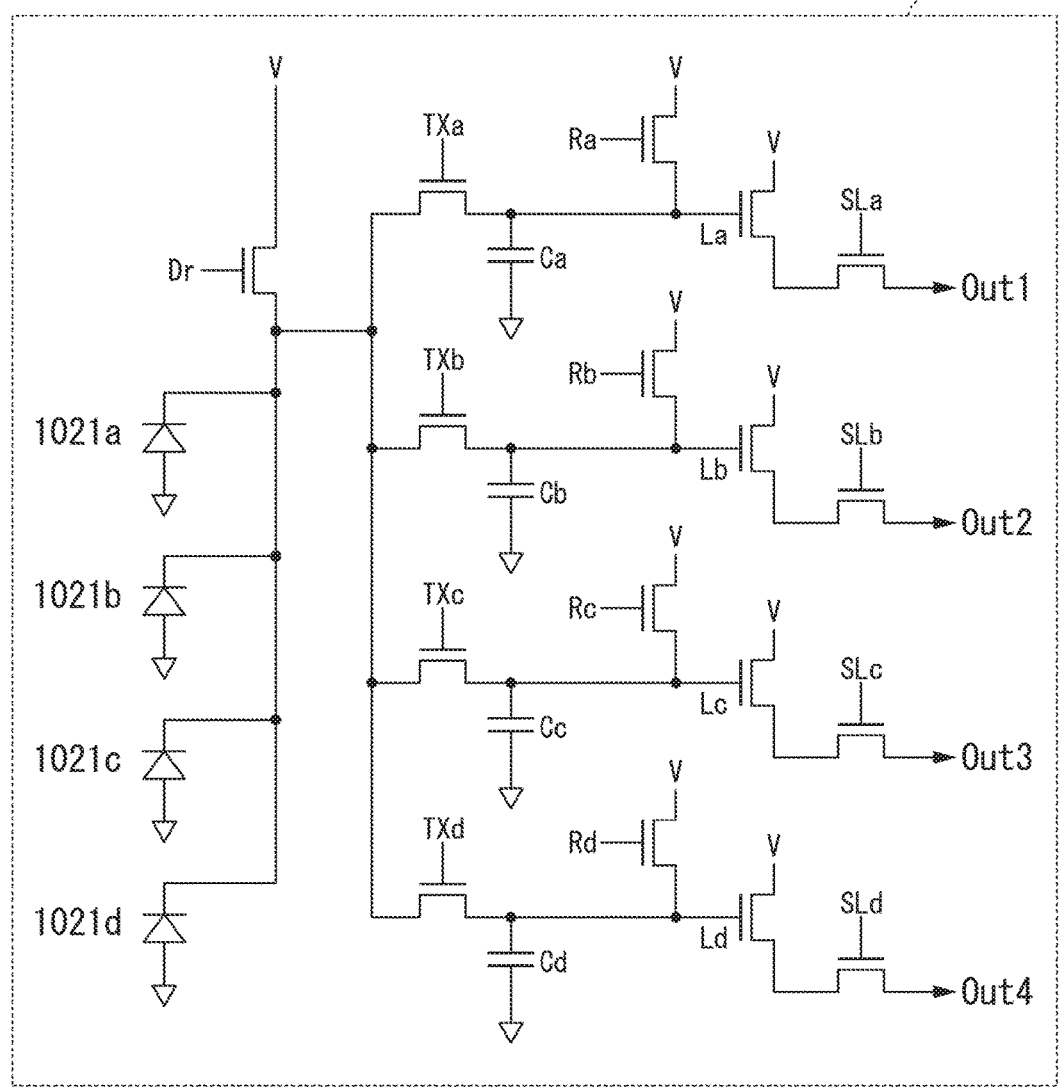
FIG. 4 is a view showing an equivalent circuit of the pixel of FIG. 3.

FIG. 4 is a view showing an equivalent circuit of the pixel 121 of FIG. 3. In FIG. 4, the micro conversion units 1021a to 1021d are represented as a photodiode. One of the electric charge accumulation regions 1022a to 1022d (FIG. 3) adjacent to each of the sort gates Txa to Txd is represented as each of condensers Ca to Cd. The FET (Field-Effect Transistor) of one of the reset gates Ra to Rd is turned on, and thereby, each of the condensers Ca to Cd is charged at a voltage V. The operation is the reset process described above and is a process for allowing the state of the electric charge accumulation regions 1022a to 1022d to return to a state (initial state) before the electric charges generated by the micro conversion units 1021a to 1021d are accumulated.

Field-effect transistors La to Ld are level-shift transistors. In the field-effect transistors La to Ld, when one of readout gates SLa to SLd is opened, a current corresponding to the electric charges held by each of the condensers Ca to Cd is sent out via the readout circuit 124 (FIG. 2) to the demodulator 105 (FIG. 1).

The four micro conversion units 1021a to 1021d and the electric charge transfer region 1023 (FIG. 3) can be formed of an integrated N-type region buried in a P-type region (P-well). A light-shield film (light-shield mask) is provided above the integrated N-type region such that light enters only the micro conversion units 1021a to 1021d of the configurations of the pixel 121.

In the present embodiment, the phase is detected by using a signal received by the micro conversion unit 1021a which is at least one of the four micro conversion units 1021a to 1021d. The micro conversion unit used for the detection of the phase is not limited to the micro conversion unit 1021a and may be any one of the other micro conversion units 1021b to 1021d.

[Operation of Pixel 121]

Next, the operation of the pixel 121 is described with reference to FIG. 3 to FIG. 5. The following control of each gate is performed by the control unit 107. In the following description, a duration in which a reset is performed is referred to as a "reset duration", a duration in which a level after a reset is read out is referred to as a "reset level readout duration", a duration in which an exposure is performed is referred to as an "exposure duration", and a duration in which a readout is performed is referred to as a "readout duration".

Figure 5:
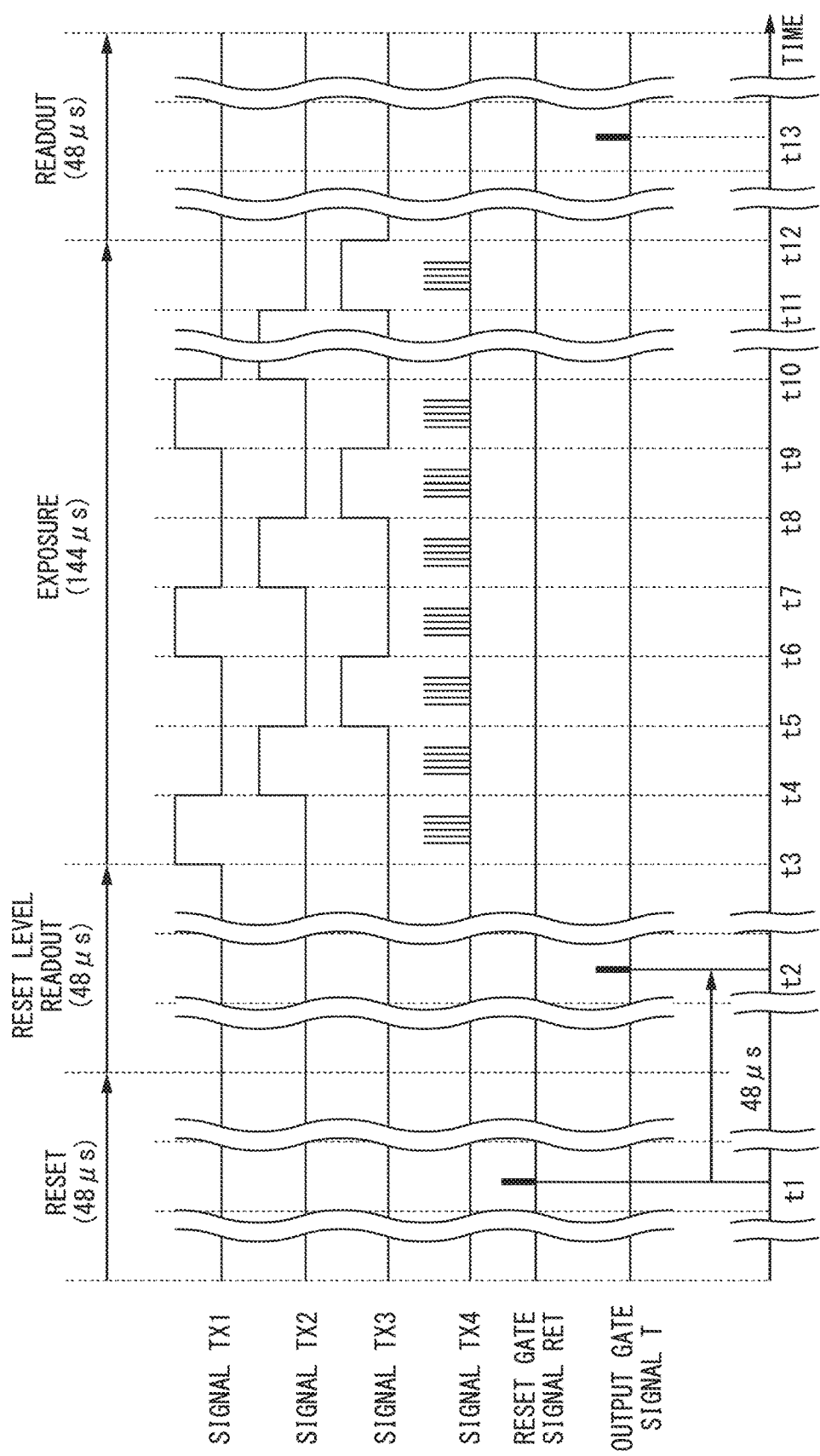
FIG. 5 is a view showing a timing chart of each gate according to the embodiment.

FIG. 5 is a view showing a timing chart of each gate (sort gates Txa to Txd, reset gates Ra to Rd, and readout gates SLa to SLd) according to the present embodiment. In FIG. 5, the horizontal axis represents time, and the vertical axis represents the H (high) level and the L (low) level of a signal. The control of each signal (signals TX1 to TX4, a reset gate signal RET, and an output gate signal T) shown in FIG. 5 is performed by the control unit 107. As shown in FIG. 5, one period of the control signal includes the reset duration, the reset level readout duration, the exposure duration, and the readout duration. The reset duration is, for example, 48 [μs]. The reset level readout duration is, for example, 48 [μs]. The exposure duration is, for example, 144 [μs]. The readout duration is, for example, 48 [μs]. One of the signals TX1 to TX4 is a signal for switching between an ON state and an OFF state of each of the sort gates Txa to Txd. The reset gate signal RET is a signal for switching between an ON state and an OFF state of the reset gates Ra to Rd. The output gate signal T is a signal for commanding, to the readout circuit 124, the timing when the voltages of the electric charge accumulation regions 1022a to 1022d are read out.

The control unit 107 outputs the reset gate signal RET of which the H level is a predetermined time to the reset gates Ra to Rd at a time t1 in the reset duration immediately before an exposure is started. The reset gates Ra to Rd are opened in response to the reset gate signal RET, and thereby, the electric charge transfer region 1023 and the electric charge accumulation regions 1022a to 1022d are reset.

The control unit 107 outputs a readout signal T (output gate signal T) of which the H level is a predetermined time to the sort gates Txa to Txd at a time t2 in the reset level readout duration after a predetermined time (for example, 48 [μs]) after the reset gate signal RET is output.

The four sort gates Txa to Txd open in response to the readout signal T. The control unit 107 reads the levels of signal outputs (Out1 to Out4) at the time t2.

The control unit 107 outputs, to the sort gate Txa, the signal TX1 that controls the sort gate Txa to open in a time t3 to t4 duration in the exposure duration. The sort gate Txa opens in response to the signal TX1, and the electric charge generated by the four micro conversion units 1021a to 1021d is accumulated by the electric charge accumulation region 1022a (condenser Ca) via the electric charge transfer region 1023. The control unit 107 opens the sort gate Txd while the sort gate Txa is closed, and the electric charge generated by the four micro conversion units 1021a to 1021d is accumulated by the electric charge accumulation region 1022d (condenser Cd) via the electric charge transfer region 1023. Further, the control unit 107 opens the drain gate Dr while the sort gate Txd is closed, and an excess electric charge is ejected to the drain terminal Da.

Next, when a ⅓ period elapses since the exposure time is started, the control unit 107 closes the sort gate Txa, and in a time t4 to t5 duration at a timing after the ⅓ period elapses, the control unit 107 outputs, to the sort gate Txb, the signal TX2 that opens the sort gate Txb. The sort gate Txb opens in response to the signal TX2, and the electric charge generated by the four micro conversion units 1021a to 1021d is accumulated by the electric charge accumulation region 1022b (condenser Cb) via the electric charge transfer region 1023. The control unit 107 opens the sort gate Txd while the sort gate Txb is closed, and the electric charge generated by the four micro conversion units 1021a to 1021d is accumulated by the electric charge accumulation region 1022d (condenser Cd) via the electric charge transfer region 1023.

Further, the control unit 107 opens the drain gate Dr while the sort gate Txd is closed, and an excess electric charge is ejected to the drain terminal Da.

Next, when a ⅔ period elapses since the exposure time is started, the control unit 107 closes the sort gate Txb, and in a time t5 to t6 duration at a timing after the ⅔ period elapses, the control unit 107 outputs, to the sort gate Txc, the signal TX3 that opens the sort gate Txc. The sort gate Txc opens in response to the signal TX3, and the electric charge generated by the four micro conversion units 1021a to 1021d is accumulated by the electric charge accumulation region 1022c (condenser Cc) via the electric charge transfer region 1023. The control unit 107 opens the sort gate Txd while the sort gate Txb is closed, and the electric charge generated by the four micro conversion units 1021a to 1021d is accumulated by the electric charge accumulation region 1022d (condenser Cd) via the electric charge transfer region 1023. Further, the control unit 107 opens the drain gate Dr while the sort gate Txd is closed, and an excess electric charge is ejected to the drain terminal Da.

Each of the time t3 to t4 duration, the time t4 to t5 duration, and the time t5 to t6 duration is, for example, 12 [μs]. The control unit 107 performs, four times, the process of the time t3 to t6 in a time t3 to t12 duration in the exposure duration.

The control unit 107 closes the sort gate Txc at a time t12 when one period elapses since the exposure time is started.

Next, the control unit 107 outputs the output gate signal T of which the H level is a predetermined time to the sort gate Txa at a time t13 in the readout duration. The four sort gates Txa to Txd are opened in response to the readout signal T, and thereby, the electric charges accumulated by the electric charge transfer region 1023 and the electric charge accumulation regions 1022a to 1022d are output.

[Description of Amplitude and Phase of Carrier Wave]

Next, the amplitude and the phase of a carrier wave are described. The carrier wave may be a sinusoidal wave or a pulse wave. The following embodiment is described using an example in which the carrier wave is a pulse wave.

Figure 6:
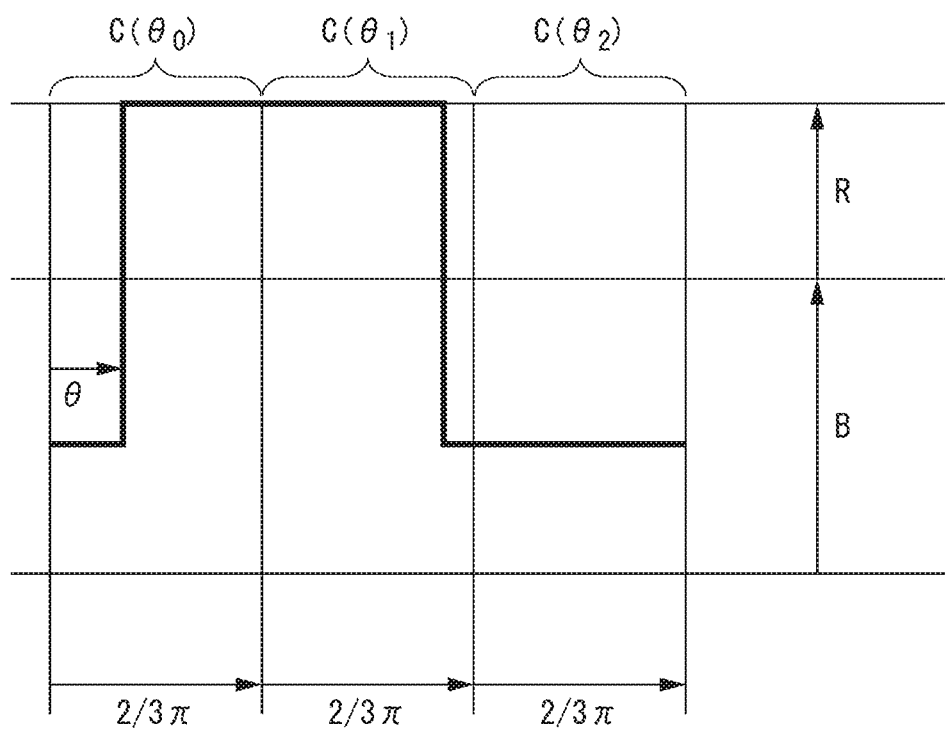
FIG. 6 is a schematic view representing an overview for calculating the amplitude and the phase of a carrier wave which is a pulse wave based on three voltage levels that are read out from the pixel according to the embodiment.

FIG. 6 is a schematic view representing an overview for calculating the amplitude and the phase of a carrier wave which is a pulse wave based on three voltage levels that are read out from the pixel 121 according to the present embodiment. The waveform shown in FIG. 6 represents one period of a pulse wave that forms the carrier wave.

In FIG. 6, $C(\theta_0)$, $C(\theta_1)$, and $C(\theta_2)$ represent a voltage level, that is, an intensity of the carrier wave for each ⅓ period. Even in the pulse wave, the demodulator 105 (FIG. 1) calculates an amplitude R of the carrier wave and a phase θ of the carrier wave for each (⅔)π.

A center level B of the carrier wave is represented by the following Expression (1). The amplitude R of the carrier wave is represented by the following Expression (2). The phase θ of the carrier wave is represented by the following Expression (3).

$$B = \frac{C(\theta_0) + C(\theta_1) + C(\theta_2)}{2\pi} \quad (1)$$

$$R = \frac{3}{2\pi} \text{MAX}\left( \text{ABS}\left(C(\theta_0) - \frac{2}{3}\pi B\right), \text{ABS}\left(C(\theta_1) - \frac{2}{3}\pi B\right), \text{ABS}\left(C(\theta_2) - \frac{2}{3}\pi B\right) \right) \quad (2)$$

$$\begin{aligned}\theta &= \frac{1}{3}\pi - \frac{1}{2}D_0 \quad \text{(when } D_1 \text{ or } -D_2 \text{ is maximum)} \\ &= \pi - \frac{1}{2}D_1 \quad \text{(when } D_2 \text{ or } -D_0 \text{ is maximum)} \\ &= \frac{5}{3}\pi - \frac{1}{2}D_2 \quad \text{(when } D_0 \text{ or } -D_1 \text{ is maximum)}\end{aligned} \quad (3)$$

In Expression (2), MAX( ) is a function that obtains a maximum value, and ABS( ) is a function that obtains an absolute value. In Expression (3), $D_0$ is the following Expression (4), $D_1$ is the following Expression (5), and $D_2$ is the following Expression (6).

$$D_0 = \frac{C(\theta_0) - \frac{2}{3}\pi B}{R} \quad (4)$$

$$D_1 = \frac{C(\theta_1) - \frac{2}{3}\pi B}{R} \quad (5)$$

$$D_2 = \frac{C(\theta_2) - \frac{2}{3}\pi B}{R} \quad (6)$$

[Description of Transmission Signal and Encoding]

Next, an example of a transmission signal transmitted by the transmission apparatus 20 is described.

Figure 7:
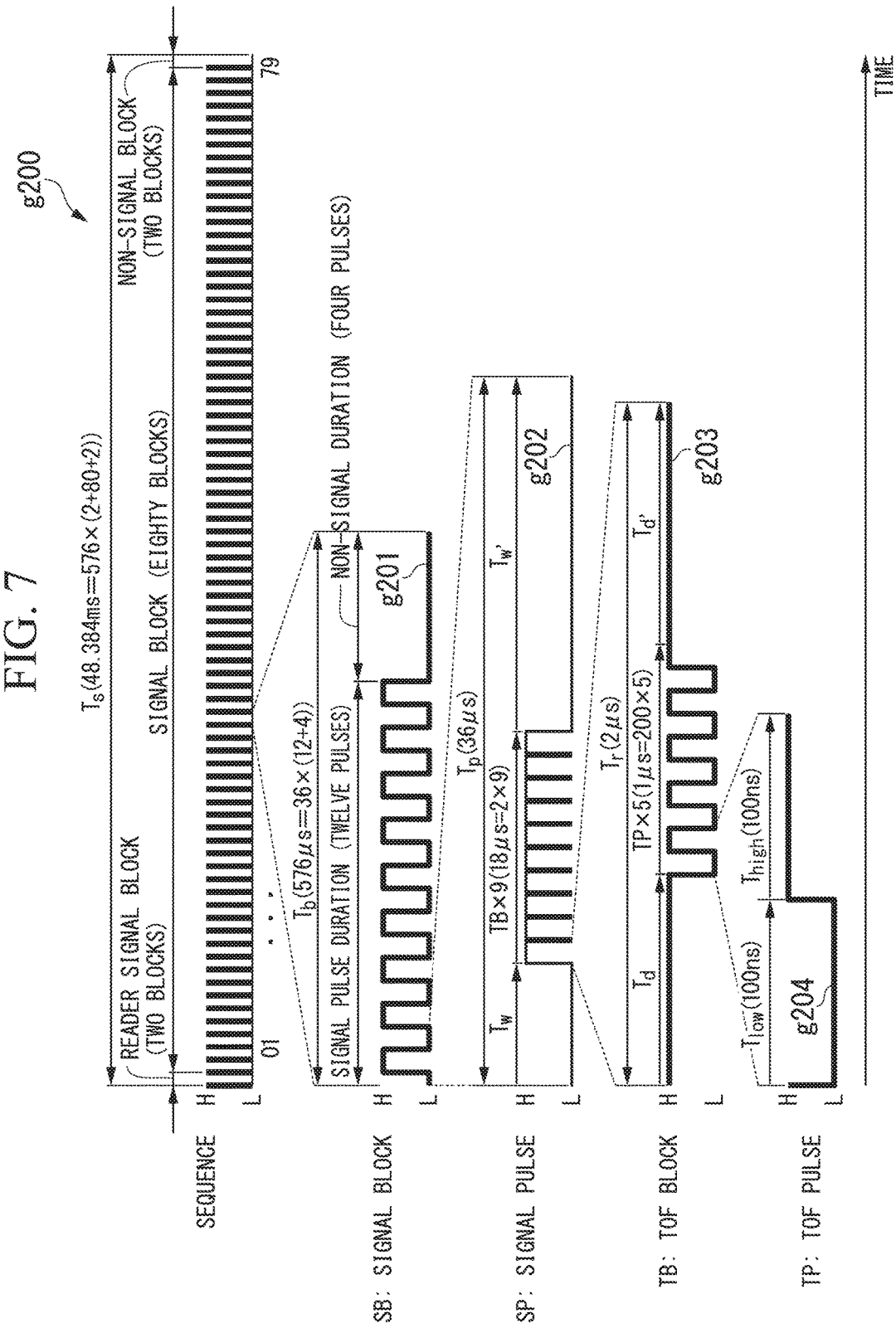
FIG. 7 is a view showing a configuration example of a transmission signal according to the embodiment.

FIG. 7 is a view showing a configuration example of a transmission signal according to the present embodiment. In FIG. 7, the horizontal axis represents time, and the vertical axis represents the H level and the L level of each signal.

As shown in FIG. 7, one sequence of a transmission signal g200 is formed of two reader signal blocks, eighty (n=0 to 79) signal blocks, and two non-signal blocks. One period $T_s$ of one sequence of the transmission signal g200 is 48.384 [msec] (=576 [μsec]×(2+80+2)). A non-signal duration may be provided before and after the sequence such that the number of sequences per one second is an integer.

The reader signal block is a block of a signal that indicates the start of a signal block.

The signal block SB is a block of a signal in which transmission information is encoded and modulated.

The non-signal block is a block that indicates the end of a signal block and is in a non-signal state.

A waveform g201 is an enlarged waveform of one signal block SB. The one signal block SB is formed of twelve signal pulses and four non-signals. Twelve signal pulses correspond to three ticks. One tick corresponds to four signal pulses.

A duration of a non-signal (also referred to as a non-signal duration) is a duration for four signal pulses. One signal pulse is 36 [μsec]. The non-signal duration is the duration for four signal pulses and therefore corresponds to one tick. Therefore, one period $T_b$ of the signal block is 576 [μsec] (=36 [μsec]×(12+4)). In the waveform g201, the non-signal duration is the L level but may be the H level.

A waveform g202 is an enlarged waveform of one signal pulse SP. The one signal pulse SP is formed of a duration $T_w$ that represents a phase, nine TOF blocks, and a remaining duration $T_{w'}$. The duration of the TOF block TB is 18 [μsec] (=2 [μsec]×9) since the duty is 50%. One period $T_r$ of the TOF block is a duration of (TP×5) (=1 [μsec])×2, that is, 2 [μsec]. The duration $T_w$ that represents a phase is 0 when the phase is 0 degrees, is $T_p \times \frac{1}{3}$ when the phase is 120 degrees, and is $T_p \times \frac{2}{3}$ when the phase is 240 degrees. That is, a bit value is determined depending on the length of the duration $T_w$ that represents a phase.

A waveform g203 is an enlarged waveform of the TOF block TB. The one TOF block TB is formed of a delay duration $T_d$, five TOF pulses, and a remaining duration $T_{d'}$. The delay duration $T_d$ is a predetermined time.

A waveform g204 is an enlarged waveform of the TOF pulse TP. One period of the TOF pulse TP is 200 [nsec], the L level duration $T_{low}$ is 100 [nsec], and the H level duration $T_{high}$ is 100 [nsec].

The relationship among the one period $T_s$ of the sequence, the one period $T_b$ of the signal block SB, the one period $T_p$ of the signal pulse SP, the duration $T_w$ that represents a phase, the remaining duration $T_{w'}$, the one period $T_r$ of the TOF block TB, the delay duration $T_d$, the H level duration $T_{high}$ and the L level duration $T_{low}$ of the TOF pulse TP, and the remaining duration $T_{d'}$, shown in FIG. 7 is represented by the following Expression (7). The relationship of Expression (7) is determined based on an orthogonality condition.

$$\left. \begin{array}{l} T_s = (2 + 80 + 2)T_b \\ T_b = (12 + 4)T_p \\ T_p = T_w + 9T_r + T_{w'} \\ T_r = T_d + 5(T_{low} + T_{high}) + T_{d'} \end{array} \right\} \quad (7)$$

[Operation of Terminal 10 During Reception]

Next, an operation of the terminal 10 during reception of a transmission signal is described.

Figure 8:
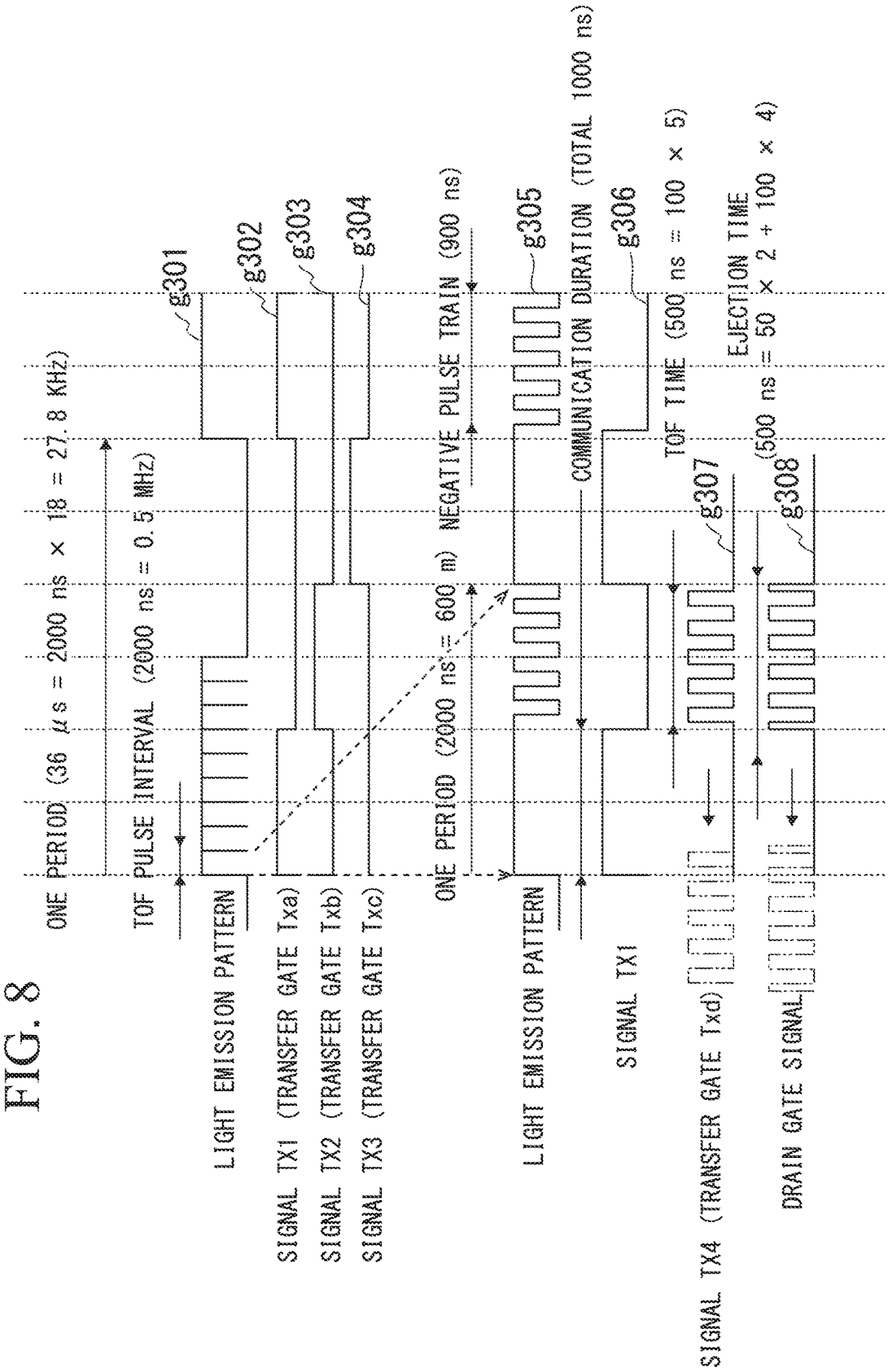
FIG. 8 is a view showing an operation example of a terminal during reception according to the embodiment.

FIG. 8 is a view showing an operation example of the terminal 10 during reception according to the present embodiment. In FIG. 8, the horizontal axis represents time, and the vertical axis represents the H level and the L level of each signal.

A waveform g301 is a waveform example of a light emission pattern of a transmission signal transmitted by another terminal 10. A waveform g302 is a waveform of the signal TX1 for switching between an ON state and an OFF state of the transfer gate Txa. A waveform g303 is a waveform of the signal TX2 for switching between an ON state and an OFF state of the transfer gate Txb. A waveform g304 is a waveform of the signal TX3 for switching between an ON state and an OFF state of the transfer gate Txc.

A waveform g305 is an enlarged waveform of the waveform g301. A waveform g306 is an enlarged waveform of the waveform g302. A waveform g307 is a waveform of the signal TX4 for switching between an ON state and an OFF state of the transfer gate Txd. A waveform g308 is a waveform of the drain gate signal for switching between an ON state and an OFF state of the drain gate Dr.

As shown in the waveform g301, one period of the light emission pattern of the transmission signal is 36 [µs] (=2000 [ns]×18=27.8 [kHz]). The TOF pulse interval is 2000 [ns] (=0.5 [MHz]). As shown in the waveform g305, the one TOF pulse includes a duration in which a 1100 [ns] H level continues and a duration having a 900 [ns] negative pulse train. The negative pulse train is a pulse train in which the L level and the H level are alternately repeated as shown in the waveform g305.

As shown by the waveform g306, the signal TX1 includes a 1000 [ns] H level duration and a 1000 [ns] L level duration. The duration in which the signal TX1 is the H level includes a 1000 [ns] duration in which the light emission pattern is in the H level. The duration in which the signal TX1 is the L level includes a 900 [ns] duration in which the light emission pattern is in a negative pulse train.

The signal TX4 of the waveform g307 and the drain gate signal move from left to right during time 0 to time 2000 [ns].

As shown in the waveform g307, the signal TX4 includes five 100 [ns] H level durations. A 100 [ns] L level duration is included between the H levels. Five H level durations and four L level durations between the H level durations are integrally referred to also as a TOF time. The TOF time is 900 [ns] (=100×(5+4)).

As shown in the waveform g308, the drain gate signal includes a 50 [ns] H level duration on both sides, four 100 [ns] H level durations, and five 100 [ns] L level durations. A duration sandwiched by the two 50 [ns] H levels is also referred to as an ejection time.

The ejection time is 1000 [ns] (=50×2+100×(5+4)).

Next, a waveform example of time 0 to time 2000 [ns] of the signal TX4 is described.

Figure 9:
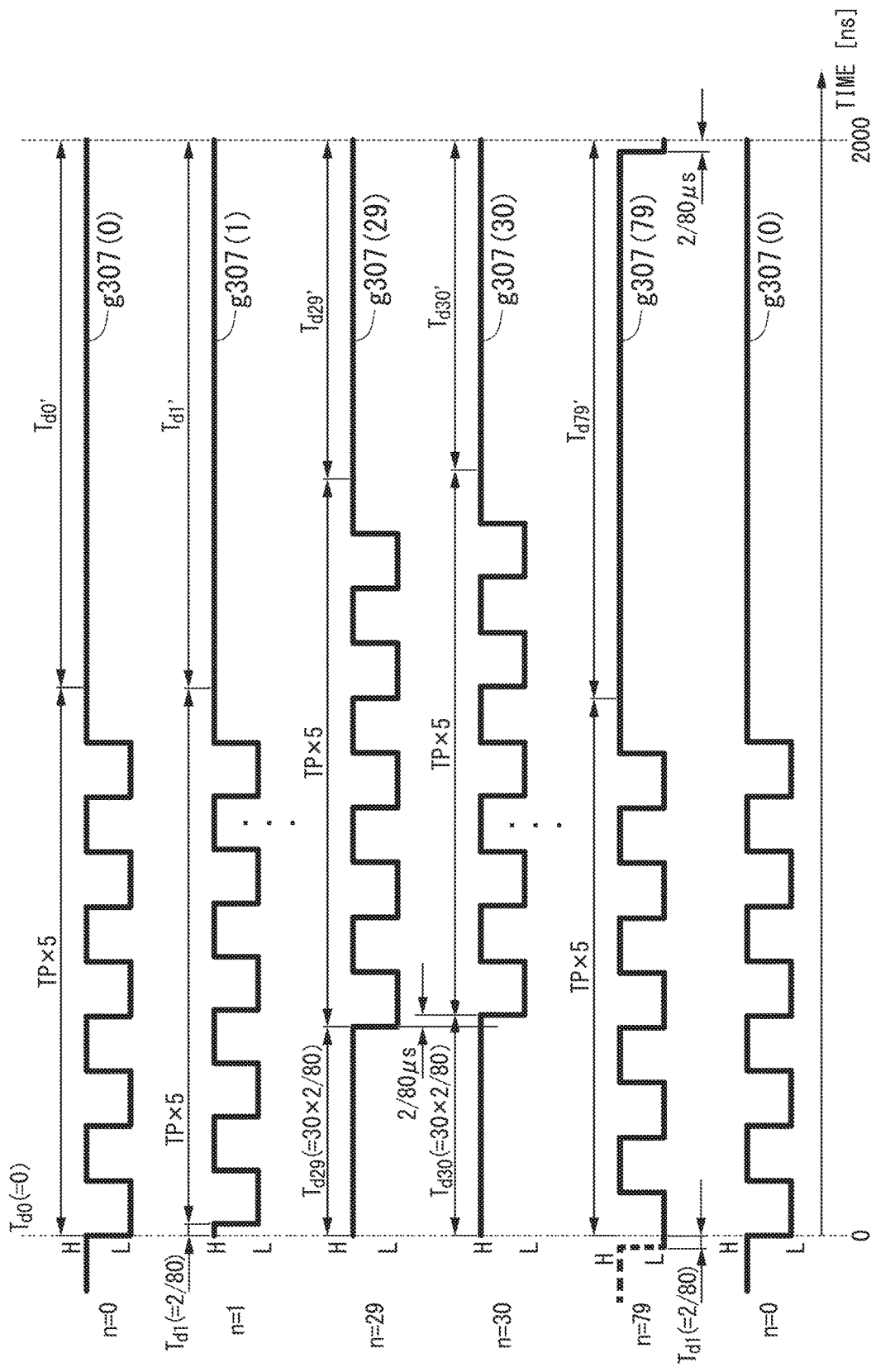
FIG. 9 is a view showing an example of a signal for each n according to the embodiment.

FIG. 9 is a view showing an example of the signal TX4 for each n according to the present embodiment. In FIG. 9, the horizontal axis represents time, and the vertical axis represents the H level and the L level of each signal. In FIG. 9, the signal at n=0 is represented as TX4(0), . . . , and the signal at n=79 is represented as TX4(79). The signal TX4 moves from left to right eighty times during time 0 to time 2000 [ns] in response to the control of the control unit 107.

A waveform g307(0) is a TX4 signal at n=0. At n=0, the delay duration $T_{d0}$ of the pulse TP is 0. That is, the waveform g307(0) is started from time 0.

Next, a waveform g307(1) is a TX4 signal at n=1. At n=1, the delay duration Tai of the pulse TP is 25 [nsec] (=2 [µsec]/80). That is, as shown in FIG. 9, the waveform g307(1) at n=1 is delayed by 25 [nsec] with respect to the waveform g307(0) at n=0.

Subsequently, the waveform is delayed by 25 [nsec] as n increases by one. Then, at n=79, like a waveform g307(79), only ¼ (=100 [nsec]/25 [nsec]) of the first L level duration $T_{low}$ of the pulse TP appears before 2000 [nsec], and the rest of the signal folds back to 0 [nsec].

Although omitted in FIG. 9, the drain gate signal also moves from left to right by 25 [nsec] in accordance with the movement of the TX4 signal in response to the control of the control unit 107.

[Relationship Between Incident Light Intensity and Signal Output Level]

Next, a relationship between an incident light intensity and a signal output level in the terminal 10 is described.

Figure 10:
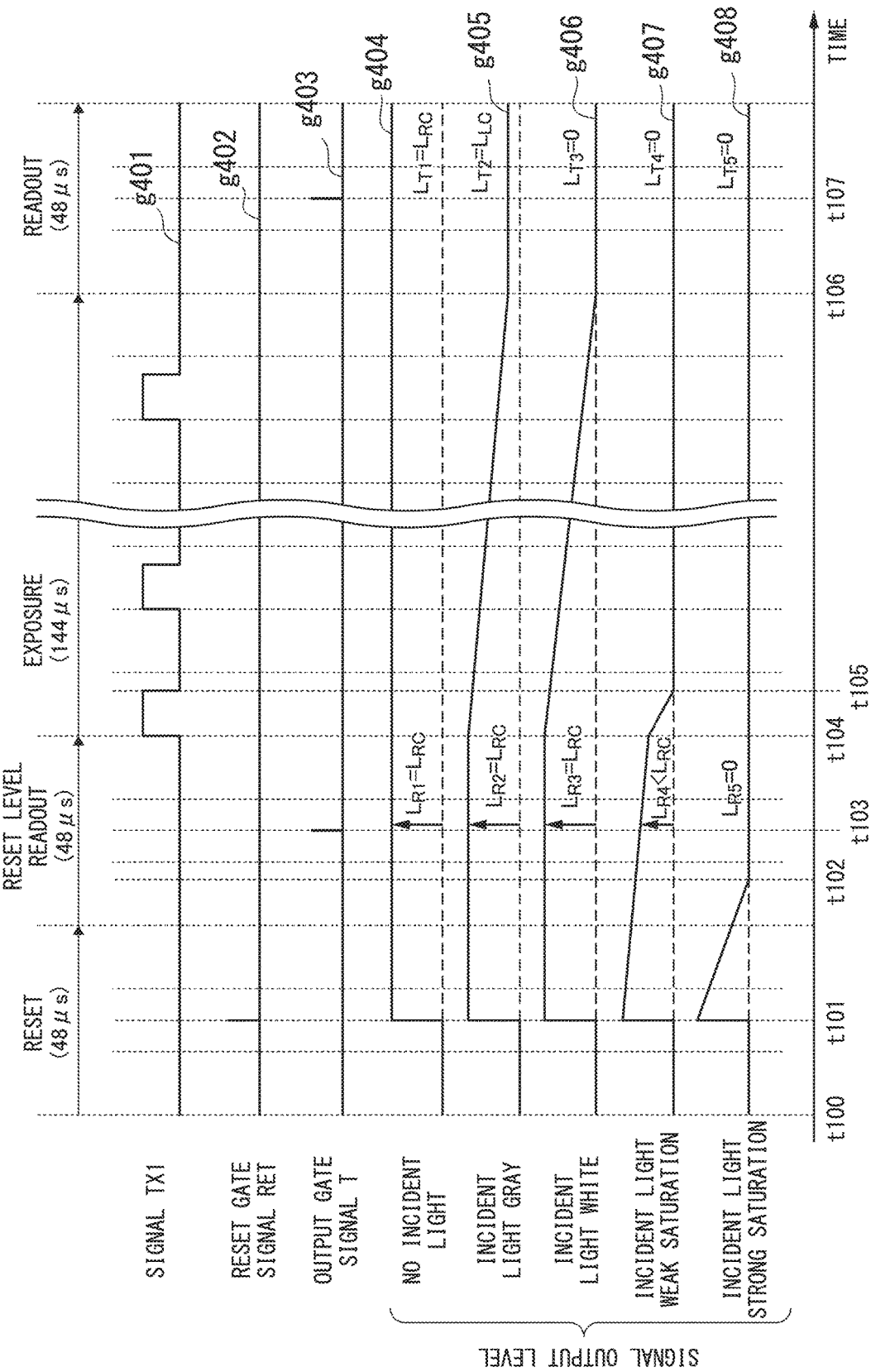
FIG. 10 is a view showing a relationship between an incident light intensity and a signal output level in a terminal according to the embodiment.

FIG. 10 is a view showing a relationship between an incident light intensity and a signal output level in the terminal 10 according to the present embodiment. In FIG. 10, the horizontal axis represents time, and the vertical axis represents the level of each signal. A waveform g401 is a waveform of the signal TX1. A waveform g402 is a waveform of the reset gate signal RET. A waveform g403 is a waveform of the output gate signal T. Waveforms g404 to g408 are waveforms of voltage levels of the electric charge accumulation regions 1022a to 1022d. The waveform g404 is a waveform of a voltage level when there is no incident light. The waveform g405 is a waveform of a voltage level when incident light is a gray level. The waveform g406 is a waveform of a voltage level when incident light is a white level. The waveform g407 is a waveform of a voltage level in a weak saturation state of incident light. The waveform g408 is a waveform of a voltage level in a strong saturation state of incident light. A reference numeral $L_{R(n)}$ (n is an integer of 1 to 5) represents a signal output level (output value after the electric charge accumulation of the pixel 121 is reset) during the reset level readout. A reference numeral $L_T$ represents a signal output level (output value when the electric charge accumulation of the pixel 121 is read out after the light reception unit 102 is exposed) during the readout. Each of the reset duration, the reset level readout duration, the exposure duration, the readout duration, and a time between the reset gate signal RET and the output gate signal T is similar to that of FIG. 5. At a time t100, light is incident on the pixel 121.

At a time t101 in the reset duration, the control unit 107 controls the reset gate signal RET to be the H level. The reset gates Ra to Rd are opened in response to this, and thereby, the electric charge transfer region 1023 and the electric charge accumulation regions 1022*a* to 1022*d* are reset.

The control unit 107 outputs the readout signal T of which the H level is a predetermined time to the sort gates Txa to Txd at a time t102 in the reset level readout duration. The four sort gates Txa to Txd open in response to the readout signal T. The control unit 107 reads the levels of signal outputs (Out1 to Out4) at the time t102.

As shown in the waveforms g404 to g406, a signal output level $L_{R1}$ when there is no incident light, a signal output level $L_{R2}$ when incident light is the gray level, and a signal output level $L_{R3}$ when incident light is the white level are identical as $L_{RC}$.

On the other hand, as shown in the waveform g407, a signal output level $L_{R4}$ in a case of incident light that causes the weak saturation state is a value smaller than $L_{RC}$. This is because the charged electric charge leaks due to the saturation.

As shown in the waveform g408, a signal output level $L_{R5}$ in a case of incident light that causes the strong saturation state is zero.

During the exposure duration of time t105 to t106 after the reset level readout duration, the control unit 107 controls the signal TX1.

The control unit 107 outputs the readout signal T of which the H level is a predetermined time to the sort gates Txa to Txd at a time t107 in the readout duration. The four sort gates Txa to Txd open in response to the readout signal T. The control unit 107 reads the levels of signal outputs (Out1 to Out4) at the time t107.

As shown in the waveform g404, a signal output level $L_{T1}$ in a case where there is no incident light is $L_{RC}$.

As shown in the waveform g405, a signal output level $L_{T2}$ in a case where incident light is the gray level is $L_{TC}$ that is smaller than $L_{RC}$.

As shown in the waveforms g406 to g408, a signal output level $L_{T3}$ in a case where incident light is the white level is zero, a signal output level $L_{T4}$ in a case of the weak saturation state is zero, and a signal output level $L_{T5}$ in a case of the strong saturation state is zero.

In this way, when the incident light is in the weak saturation state or the strong saturation state, the signal output level that is read out in the readout duration is not an appropriate value.

Therefore, in the present embodiment, the signal output level is corrected according to a method described below.

Figure 11:
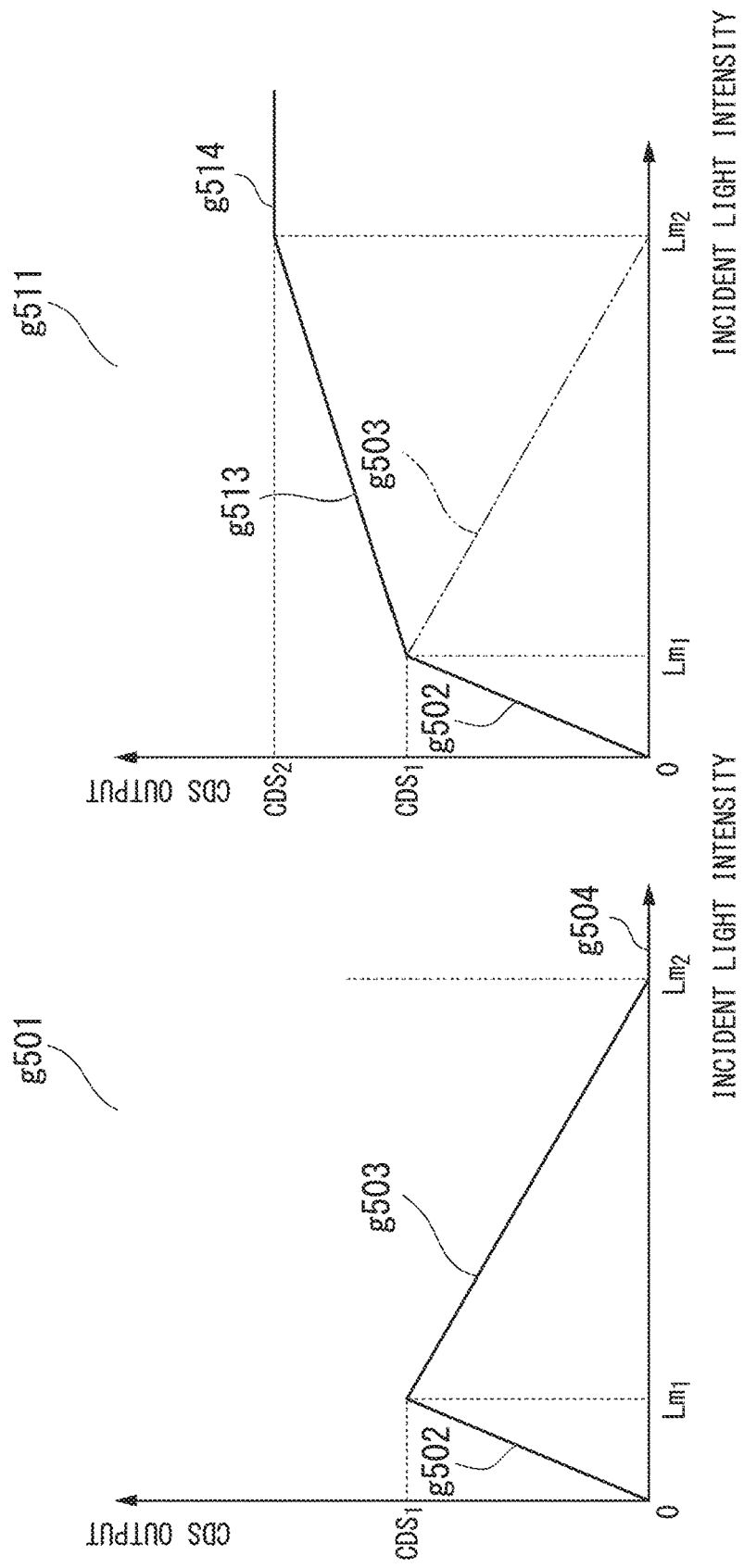
FIG. 11 is a view showing the correction of a luminance using a relationship between a CDS output and an incident light intensity.

FIG. 11 is a view showing the correction of a signal output level using a relationship between a CDS output and an incident light intensity. In FIG. 11, the horizontal axis is an incident intensity, and the vertical axis is a CDS output. The CDS output is a value ($L_R$–$L_T$) obtained by subtracting the signal output level $L_T$ in the readout duration from the signal output level $L_R$ in the reset level readout duration described in FIG. 10.

A graph in a region represented by a reference numeral g501 of FIG. 11 is a graph before correction of a CDS output versus an incident light intensity. As indicated by a straight line g502, the CDS output increases from zero to $CDS_1$ as the incident light luminance increases from zero to $Lm_1$. As indicated by a straight line g503, the CDS output decreases from $CDS_1$ to zero due to saturation as the incident light luminance increases from $Lm_1$ to $Lm_2$. As indicated by a straight line g504, the CDS output is zero due to saturation when the incident light luminance is $Lm_2$ or more.

A graph in a region represented by a reference numeral g511 of FIG. 11 is a graph after correction of a CDS output versus an incident light intensity. The straight line g502 in the incident light luminance of zero to $Lm_1$ is similar to the graph in the region represented by the reference numeral g501 and is not corrected.

As indicated by a straight line g513, the control unit 107 corrects the CDS output by using the following Expression (8) in the incident light luminance of $Lm_1$ to $Lm_2$. As a result, as indicated by the straight line g513, the CDS output increases from $CDS_1$ to $CDS_2$ as the incident light luminance increases from $Lm_1$ to $Lm_2$.

As indicated by a straight line g514, the control unit 107 corrects the CDS output by using the following Expression (8) when the incident light luminance is $Lm_2$ or more and maintains $CDS_2$ which is the CDS output value at $Lm_2$. The correction formula is stored in the storage unit 111.

$$\begin{matrix} L_R - L_T & \text{(when } L_M - O \le L_R\text{)} \\ L_M - O - L_T + G(L_M - L_R) & \text{(when } L_M - O > L_R\text{)} \end{matrix} \right\} \quad (8)$$

In Expression (8), $L_M$ is a representative value of post-reset signal output levels after a reset, and O is an offset value. $L_R$ is a post-reset signal output level after the reset, and $L_T$ is a signal output level after an exposure. G is a gain. The representative value $L_M$ of post-reset signal output levels is an average value or a standard value of the signal output level in the reset level readout duration. The gain G and the offset O may be determined, for example, in consideration of an output reduction amount due to a leakage arising from a saturation state or may be determined based on an actual measurement, a simulation result, or a learning result.

The control unit 107 may perform temperature correction of $L_M$ and O in accordance with the temperature of the pixel 121 or the terminal 10. When the temperature correction is performed, the storage unit 111 may store a table regarding a temperature assurance.

In this way, in the present embodiment, the reset level and the post-exposure signal output are sampled, and when the post-exposure level becomes the saturation level or less, the luminance is corrected by adding the reduction degree of the reset level. In the present embodiment, such a correction is performed for each pixel 121.

Next, an example of a luminance output after the luminance is corrected is described.

Figure 12:
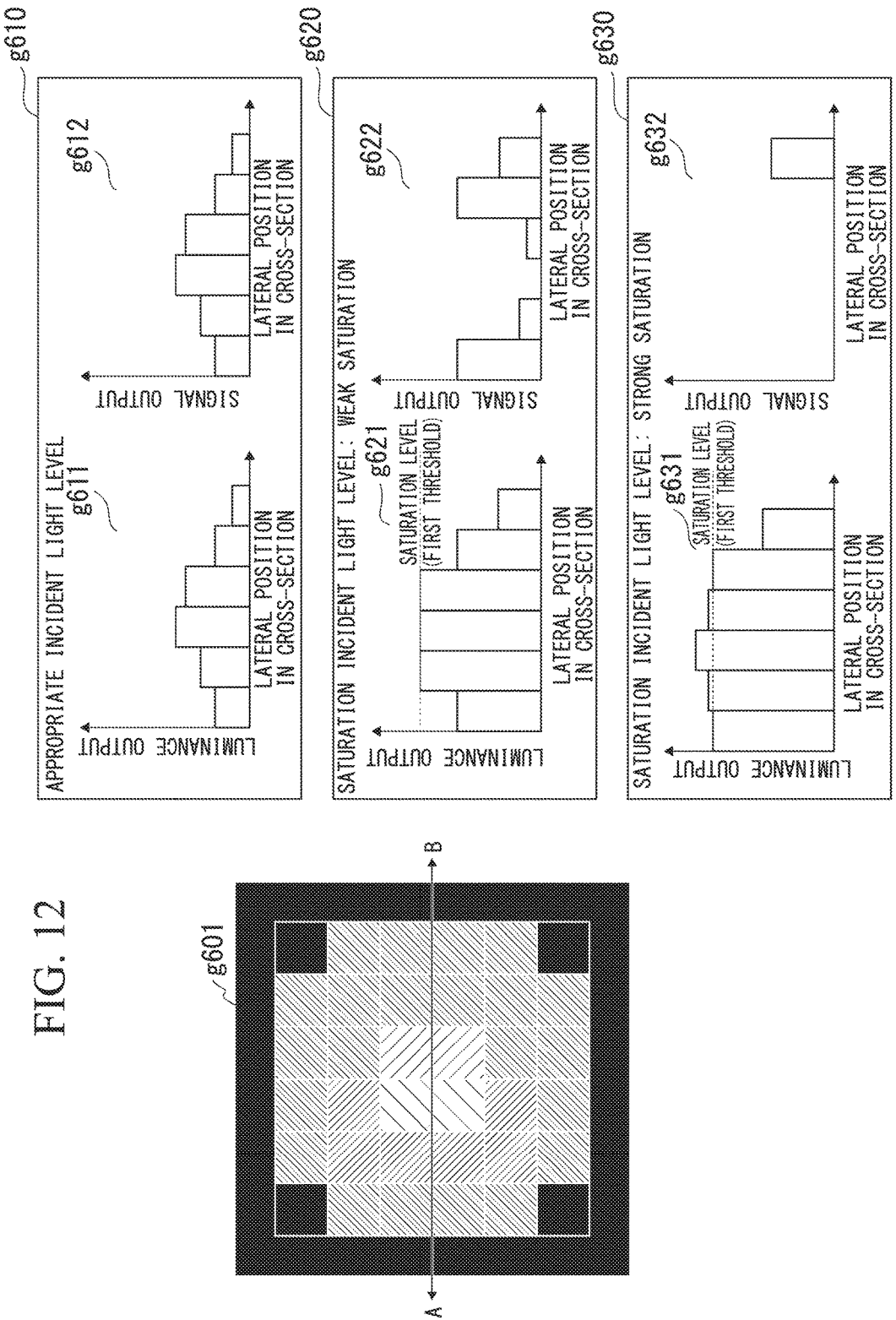
FIG. 12 is a view showing an example in which light having a predetermined luminance or more is incident on a photodetector according to the embodiment.

FIG. 12 is a view showing an example in which light having a predetermined luminance or more is incident on a photodetector according to the present embodiment. In FIG. 12, an image g601 corresponds to the image g901 of FIG. 16 according to the related art. Images g610 to g612 of FIG. 12 correspond to the images g910 to g912 of FIG. 16. Images g620 to g622 of FIG. 12 correspond to the images g920 to g922 of FIG. 16.

A graph g631 is a graph showing an example of a luminance output with respect to a cross-sectional direction in a cross-section in the A-B direction of the image g601. In the graph g631, the horizontal axis represents a position in the cross-sectional direction in the cross-section in the A-B direction of the image g601, and the vertical axis represents the level of the luminance output. A graph g632 is a graph showing an example of a signal output with respect to a cross-sectional direction in a cross-section in the A-B direction of the image g601. In the graph g632, the horizontal axis represents a position in the cross-sectional direction in the cross-section in the A-B direction of the image g601, and the vertical axis represents the level of the signal output.

Figure 16:
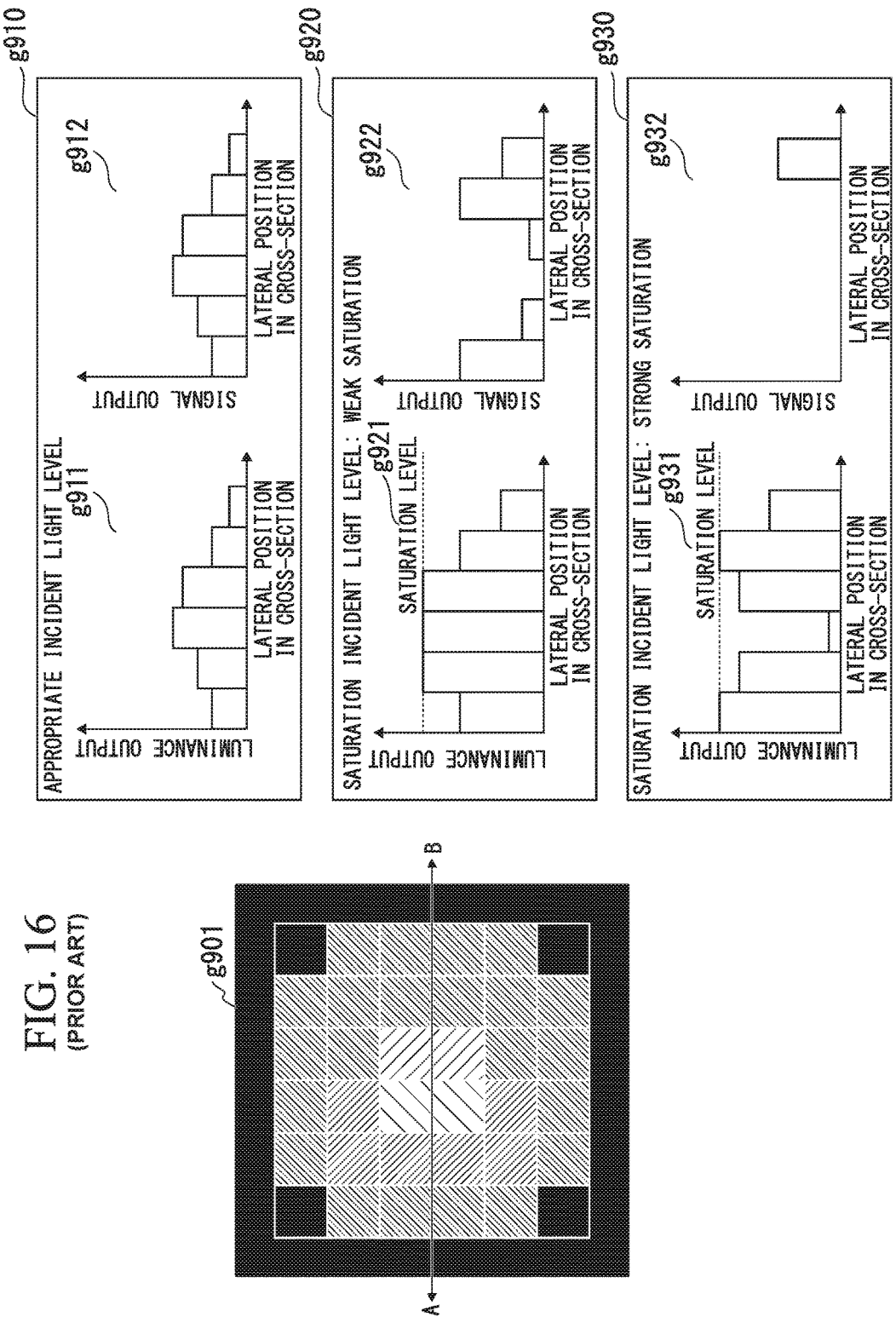
FIG. 16 is a view showing an example in which light having a predetermined luminance or more is incident on a photodetector according to the related art.

There is a difference from FIG. 16 according to the related art when the strong saturation arises. As shown in the graph g631, the luminance output at the second to fourth positions in the A to B direction is a saturation level or more according to the correction. In this way, according to the present embodiment, it is possible to prevent a blackening phenomenon while keeping an edge (shape) which is a luminance boundary and a peak.

Next, a clustering process with respect to a plurality of pixels performed in the present embodiment is described.

Figure 13:
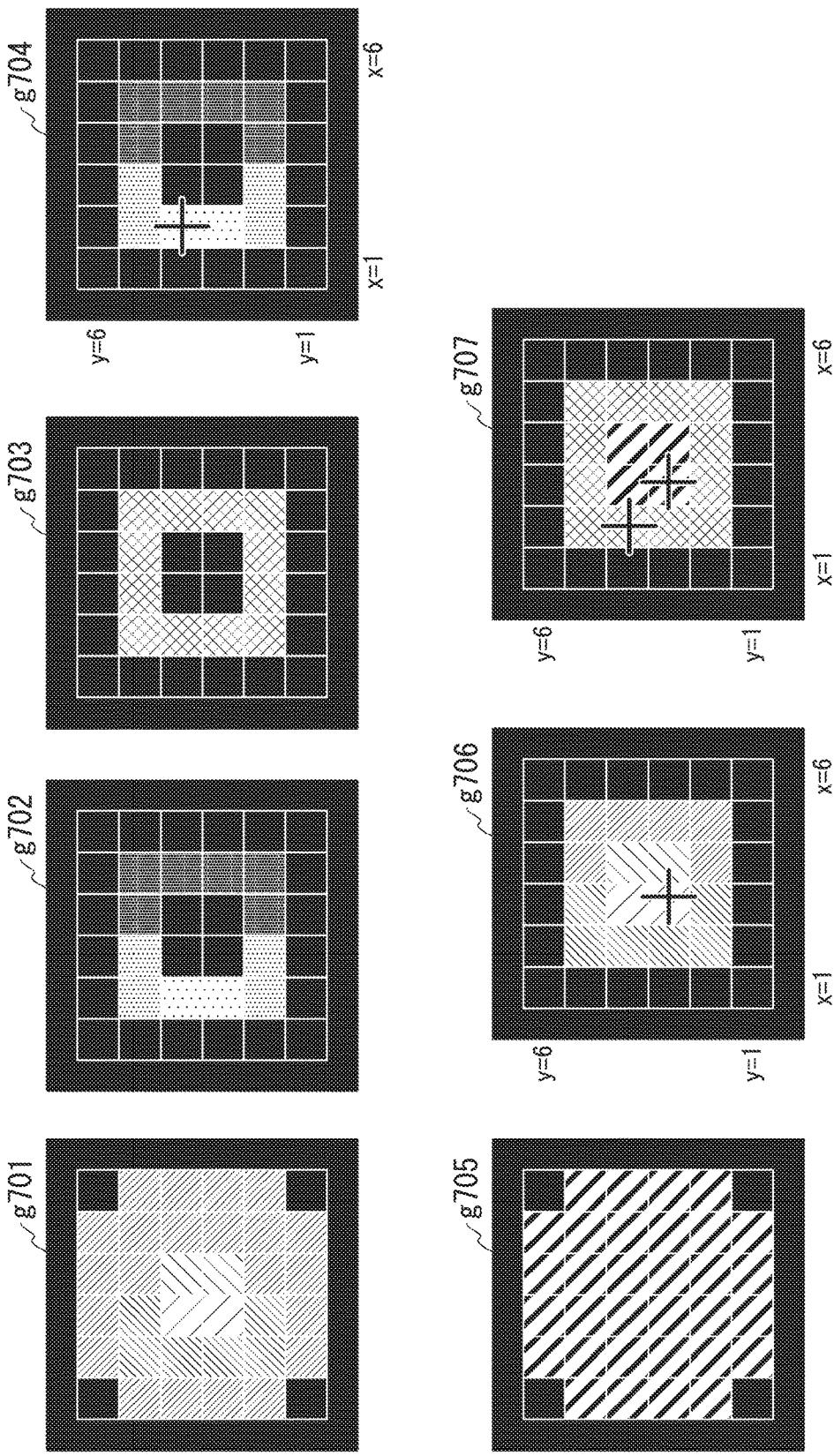
FIG. 13 is a view showing a clustering process with respect to a plurality of pixels according to the embodiment.

FIG. 13 is a view showing a clustering process with respect to a plurality of pixels 121 according to the present embodiment. FIG. 13 shows an example in which 6×6 pixels are extracted from the pixels of the light reception unit 102.

In FIG. 13, an image g701 is an image that represents the luminance of each pixel before luminance correction. An image g702 is an image that represents the luminance of each pixel after the luminance is corrected. An image g703 is an image obtained by applying clustering to a pixel having a larger amplitude than a threshold value after the luminance is corrected. An image g704 is an image obtained by extracting a maximum value of the amplitude intensity after the clustering is applied to the luminance. An image g705 is an image obtained by performing clustering based on the luminance intensity. An image g706 is an image obtained by extracting the maximum value of the luminance intensity after performing clustering based on the luminance intensity. An image g707 is an image output by the terminal 10. In FIG. 13, "+" (cross shape mark) indicates a position of a pixel at which the amplitude or the intensity is maximum.

Figure 14:
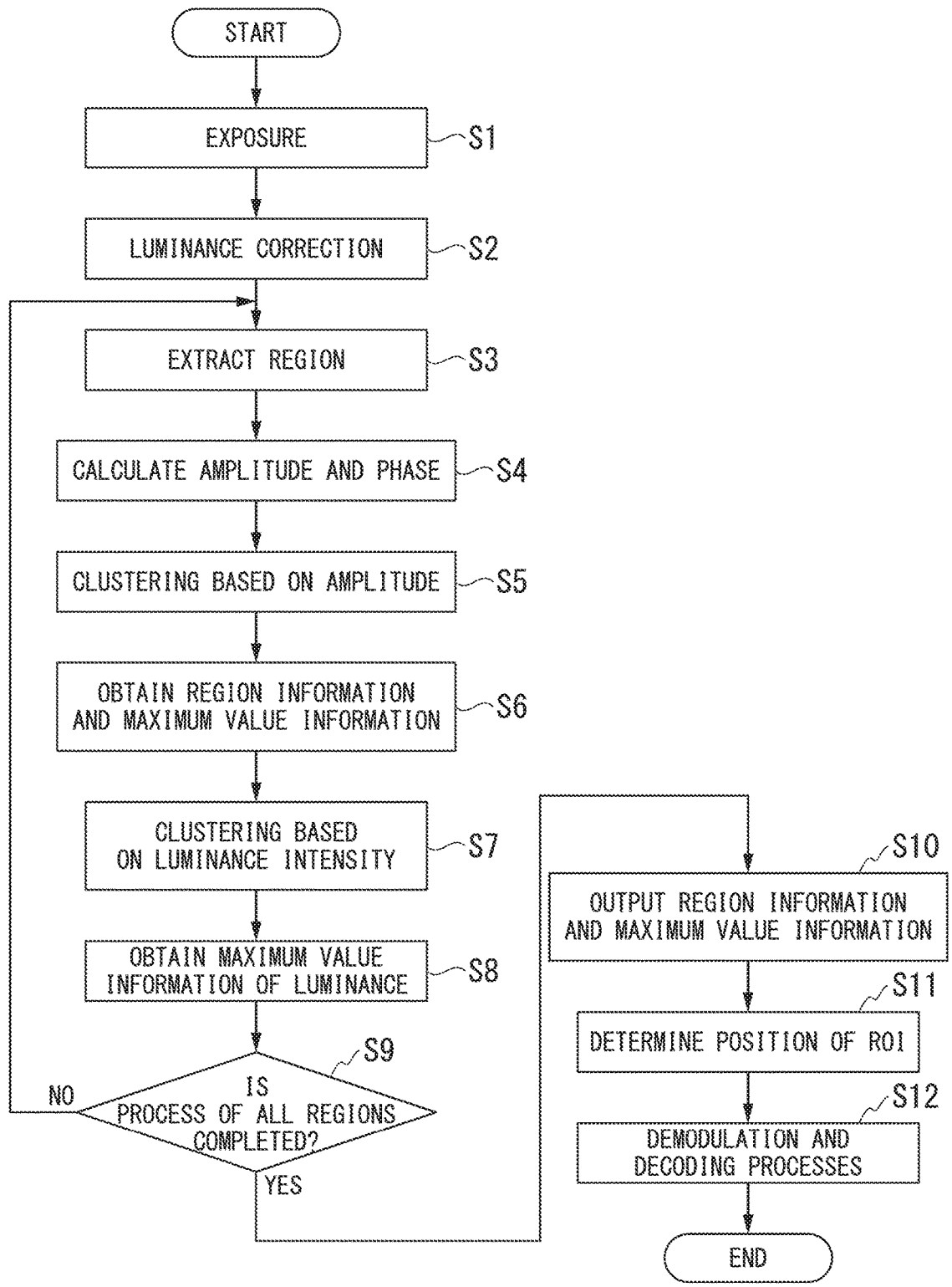
FIG. 14 is a flowchart of a process performed by a control unit according to the embodiment.

Next, an example of a process sequence performed by the control unit 107 in the present embodiment is described using FIG. 14 with reference to FIG. 13.

FIG. 14 is a flowchart of a process performed by the control unit 107 according to the present embodiment.

(Step S1) The control unit 107 performs an exposure process. The luminance after the exposure is, for example, the image g701 of FIG. 13.

(Step S2) The detection unit 108 acquires a signal output by the light reception unit 102. Subsequently, the detection unit 108 determines, for each pixel, whether or not a voltage value or a current value of the acquired signal is equal to or more than a threshold value for determining saturation that is stored in the storage unit 111. Subsequently, the correction unit 109 corrects, for each pixel, the luminance by using a correction formula stored in the storage unit 111 when the voltage value or the current value is equal to more than the threshold value based on the determination result output by the detection unit 108. The luminance after the luminance correction is, for example, the image g702 of FIG. 13.

(Step S3) The clustering unit 110 calculates the amplitude and the phase for each pixel 121.

The demodulator 105 may calculate the amplitude and the phase.

(Step S4) The clustering unit 110 extracts regions of a predetermined number from all pixels included in the light reception unit 102.

(Step S5) The clustering unit 110 performs clustering (labeling) with respect to a pixel 121 having an amplitude equal to or more than a threshold value stored in the storage unit 111 by using, for example, a k-average algorithm. The luminance after the clustering is, for example, the image g703 of FIG. 13.

(Step S6) After the result of performing clustering, the clustering unit 110 obtains region information and maximum value information of the extracted clustering region. The region information is a left end coordinate, a right end coordinate, an upper end coordinate, and a lower end coordinate of a region. The maximum value information is a maximum value of amplitude and a coordinate at the maximum value. As shown in the figure g704 of FIG. 13, in a region of 6×6 pixels, the pixels in the horizontal direction are referred to as x=1 to 6, and the pixels in the vertical direction are referred to as y=1 to 6. In the image g704, with respect to each coordinate (x, y) of the region information, the left end coordinate is x=2, the right end coordinate is x=5, the upper end coordinate is y=5, the lower end coordinate is y=2, and the coordinate at which the amplitude is the maximum value is (2, 4).

(Step S7) The clustering unit 110 performs clustering with respect to a pixel 121 having a luminance equal to or more than a threshold value stored in the storage unit 111 for the same region as that in Step S4 by using, for example, a k-average algorithm. The luminance after the clustering is, for example, the image g705 of FIG. 13. The clustering unit 110 performs the process of Step S7 by using the luminance after the luminance correction.

(Step S8) After the result of performing clustering, the clustering unit 110 calculates, as maximum value information, the coordinate of a pixel 121 at which the luminance is maximum in the extracted clustering region. In the image g705, the coordinate at which the luminance is the maximum value is (3, 3).

(Step S9) The clustering unit 110 determines whether or not the process of all regions is completed. The clustering unit 110 allows the process to proceed to Step S10 when determining that the process of all regions is completed (Step S9; YES). The clustering unit 110 allows the process to return to Step S3 when determining that the process of all regions is not completed (Step S9; NO).

(Step S10) The clustering unit 110 outputs, to an external apparatus (not shown), region information for each region, maximum value information of the amplitude, maximum value information of the luminance, information indicating the luminance after correction of each pixel 121, and information indicating the amplitude and the phase of each pixel 121. The clustering unit 110 may output, as information, an outline as the signal region. The control unit 107 may bury a recessed part of a region having a recessed shape to form an outline shape by using a Snakes method when extracting the outline.

(Step S11) The clustering unit 110 determines the center of a ROI (Region of Interest) that should be taken in next such that the coordinate at which the amplitude is maximum obtained in Step S6 is centered. The clustering unit 110 may determine the center of a ROI that should be taken in next such that the coordinate at which the luminance is maximum obtained in Step S8 is centered.

(Step S12) The control unit 107 pursues the phase and the amplitude of a pixel having a maximum amplitude intensity in a time series and decodes information included in the received signal by demodulation and decoding processes. When a plurality of signals are included in the ROI, the control unit 107 decodes information as separate signals if the signals are separately clustered with respect to the amplitude.

The control unit 107 performs the process of Step S1 to S12 for each one frame. The one frame is, for example, 48.384 [ms].

In the example shown in FIG. 13 and FIG. 14, an example in which the number of pixels of the region is 6×6 pixels is shown; however, the embodiment is not limited thereto. The number of pixels of the region may be another number.

An example of a maximum position extracted by the control unit 107 according to the processes of Step S1 to S12 is described.

Figure 15:
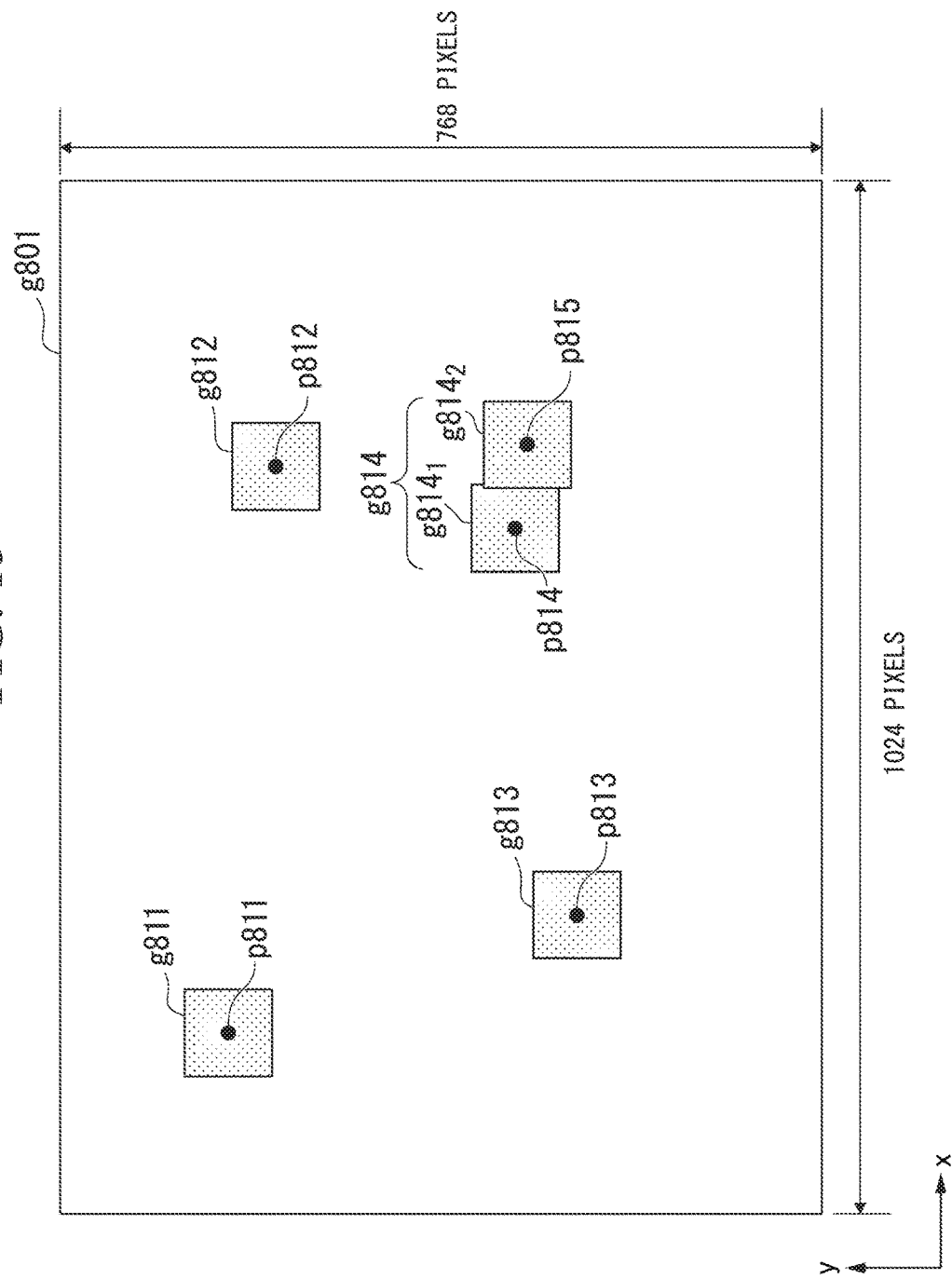
FIG. 15 is a view showing an example of a detection result of a light emission signal according to the embodiment.

FIG. 15 is a view showing an example of a detection result of a light emission signal (transmission signal) according to the present embodiment.

The example shown in FIG. 15 is an example in which the light reception unit 102 is 1024×768 pixels. An image g801 is an image showing an example of a result of scanning all pixels. An image g811 shows a region in which, for example, the identifier ID is clustered into one. A position p811 shows a coordinate at which the luminance is maximized in the image g811. An image g812 shows a region in which, for example, the ID is clustered into two.

A position p812 shows a coordinate at which the luminance is maximized in the image g812. An image g813 shows a region in which, for example, the ID is clustered into three. A position p813 shows a coordinate at which the luminance is maximized in the image g813. An image g814 shows a region in which, for example, an image g8141 of a region in which the ID is clustered into four and an image g814$_2$ of a region in which the ID is clustered into five are adjacent to each other. A position p814 shows a coordinate at which the luminance is maximized in the image g8141. A position p815 shows a coordinate at which the luminance is maximized in the image g814$_2$.

The control unit 107 moves, for example, the readout region in the x-axis direction and, after arriving at the right end of the image g801, allows the readout region to return to the left end in the x-axis direction in the image g801. At this time, the control unit 107 moves the readout region by one pixel in the y-axis direction. Then, the control unit 107 moves the readout region in the x-axis direction. The control unit 107 allows the readout region to return to the upper left end when the readout region arrives at the lower right end.

As shown in FIG. 15, in the present embodiment, a coordinate (position) at which the luminance is maximized is obtained in a region in which clustering is performed. Thereby, according to the present embodiment, even when a plurality of regions are adjacent in the image g814, the control unit 107 can determine that a plurality of regions are adjacent when the region includes a plurality of coordinates at which the luminance is maximized.

As described above, according to the present embodiment, the output is corrected in accordance with the progress state of the saturation of the output voltage, and therefore, even when a further bright place is imaged, it is possible to appropriately capture a peak and an edge (shape) of the part while being capable of preventing a blackening phenomenon.

Further, according to the present embodiment, it is possible to correct the output when the output of the pixel 121 of the light reception unit 102 is saturated, and therefore, even when a further bright place is imaged, it is possible to appropriately capture a peak and an edge (shape) of the part while being capable of preventing a blackening phenomenon.

Further, according to the present embodiment, a gain G that should be added is determined in consideration of an output reduction amount due to a leakage arising from the saturation state, and therefore, even when a still further bright place is imaged, it is possible to appropriately capture the peak and the edge.

Further, according to the present embodiment, the clustering is performed based on the amplitude or the luminance after correction with respect to the plurality of pixels 121 included in the light reception unit 102, and thereby, it is possible to detect the size of the region of the light emission signal (transmission signal). Further, according to the present embodiment, the position of the maximum value of the amplitude in the cluster or the position of the maximum value of the luminance after correction is detected, and thereby, it is possible to detect a center position of the light emission signal.

Further, according to the present embodiment, the center position of the light emission signal is set to the center of the space of interest ROI, and thereby, it is possible to appropriately set the center of the light emission signal when the light emission signal is received next time.

A program for realizing at least one of the functions of the demodulator 105, the decoder 106, and the control unit 107 of the terminal 10 in the embodiment of the invention may be recorded in a computer-readable recording medium, and the program recorded in the recording medium may be read into and executed on a computer system to thereby perform a process. It is assumed that the "computer system" used herein includes an OS or hardware such as peripherals. It is also assumed that the term "computer system" includes a WWW system including a homepage provision environment (or a display environment). The term "computer-readable recording medium" refers to a portable medium such as a flexible disk, a magneto-optical disk, a ROM, and a CD-ROM, or a storage device such as a hard disk embedded in the computer system. It is also assumed that the term "computer-readable recording medium" includes a medium which holds a program for a given time such as a volatile memory (RAM) in the computer system which becomes a server or a client when a program is transmitted through a network such as the Internet or a communication line such as a telephone line.

The program may be transmitted from the computer system which stores the program in the storage device or the like to other computer systems through a transmission medium or through transmission waves in the transmission medium. The term "transmission medium" which transmits the program refers to a medium which has a function of transmitting information, for example, a network (communication network) such as the Internet or a communication line such as a telephone line. The program may be a program which can realize part of the above-described functions. The program may be a so-called differential file (differential program) which can realize the above-described functions by a combination with a program already recorded in the computer system.

Although the embodiment of the invention has been described and shown, the invention is not limited to the above-described embodiment, and addition, omission, and substitution of the configuration and other changes can be made without departing from the scope of the invention.

The invention claimed is:

1. An imaging apparatus, comprising:
a light reception unit that receives a light emission signal from a transmission apparatus via a pixel;
a detection unit that detects whether or not an output based on the light emission signal received by the light reception unit is a first threshold value or more; and
a correction unit that corrects a luminance of the pixel when the output based on the light emission signal is the first threshold value or more based on a result detected by the detection unit,
wherein the detection unit detects whether or not the output based on the light emission signal is the first threshold value or more based on an output value after an electric charge accumulation of the pixel is reset and an output value when an electric charge accumulation of the pixel is read out after the light reception unit is exposed, and
wherein the correction unit corrects, when the output based on the light emission signal is the first threshold value or more, the luminance of the pixel by adding a value obtained by multiplying a difference between an average value of output values in a readout duration after the electric charge accumulation of the pixel is reset and the output value after the electric charge accumulation of the pixel is reset by a predetermined gain to a difference between the output value when the electric charge accumulation of the pixel is read out after the light reception unit is exposed and the output value after the electric charge accumulation of the pixel is reset.

2. The imaging apparatus according to claim 1, comprising:
a clustering unit that performs classification into clusters by using at least one of an amplitude of a signal output by the correction unit and a luminance based on a signal output by the light reception unit, wherein
the light reception unit comprises a plurality of pixels, and
the clustering unit calculates, for each cluster, at least one of a coordinate of a pixel which is a maximum value of the amplitude of the signal output by the correction unit and a coordinate of a pixel which is a maximum value of the luminance based on the signal output by the light reception unit.

3. The imaging apparatus according to claim 2, wherein
the clustering unit determines the calculated coordinate of the pixel which is a maximum value of the amplitude of the signal output by the correction unit or the calculated coordinate of the pixel which is a maximum value of the luminance based on the signal output by the light reception unit as a center of a region of interest of which the light emission signal should be taken in next.

4. An imaging method, comprising:
(a) by way of a light reception unit, receiving a light emission signal from a transmission apparatus via a pixel;
(b) by way of a detection unit, detecting whether or not an output based on the light emission signal received in (a) is a first threshold value or more based on an output value after an electric charge accumulation of the pixel is reset and an output value when an electric charge accumulation of the pixel is read out after the light reception unit is exposed; and
(c) by way of a correction unit, correcting a luminance of the pixel when the output based on the light emission signal is the first threshold value or more based on a result detected in (b), by adding a value obtained by multiplying a difference between an average value of output values in a readout duration after the electric charge accumulation of the pixel is reset and the output value after the electric charge accumulation of the pixel is reset by a predetermined gain to a difference between the output value when the electric charge accumulation of the pixel is read out after the light reception unit is exposed and the output value after the electric charge accumulation of the pixel is reset.

* * * * *